(12) United States Patent
Kuwata et al.

(10) Patent No.: US 11,411,286 B2
(45) Date of Patent: Aug. 9, 2022

(54) BATTERY STACK FORMING APPARATUS AND BATTERY STACK FORMING METHOD

(71) Applicant: Envision AESC Japan Ltd., Kanagawa (JP)

(72) Inventors: Akio Kuwata, Kanagawa (JP); Takuro Kajitani, Kanagawa (JP); Hirotaka Nakayama, Kanagawa (JP)

(73) Assignee: ENVISION AESC JAPAN LTD., Kanagawa (JP)

(*) Notice: Subject to any disclaimer, the term of this patent is extended or adjusted under 35 U.S.C. 154(b) by 0 days.

(21) Appl. No.: 16/976,759

(22) PCT Filed: Mar. 30, 2018

(86) PCT No.: PCT/JP2018/013743
§ 371 (c)(1),
(2) Date: Aug. 30, 2020

(87) PCT Pub. No.: WO2019/187042
PCT Pub. Date: Oct. 3, 2019

(65) Prior Publication Data
US 2021/0013481 A1    Jan. 14, 2021

(51) Int. Cl.
*H01M 50/538* (2021.01)
*H01M 10/04* (2006.01)
*H01M 10/0585* (2010.01)
*H01M 10/0525* (2010.01)

(52) U.S. Cl.
CPC ..... *H01M 50/538* (2021.01); *H01M 10/0404* (2013.01); *H01M 10/0585* (2013.01); *H01M 10/0525* (2013.01)

(58) Field of Classification Search
CPC .......... H01M 50/538; H01M 10/0404; H01M 10/0585; H01M 10/0525
See application file for complete search history.

(56) References Cited

U.S. PATENT DOCUMENTS

| | | |
|---|---|---|
| 2005/0123828 A1 | 6/2005 | Oogami et al. |
| 2013/0115499 A1 | 5/2013 | Joye et al. |
| 2013/0171486 A1 | 7/2013 | Joye et al. |
| 2014/0272543 A1* | 9/2014 | Devan ............... H01M 10/0585 429/162 |
| 2018/0309110 A1* | 10/2018 | Iwasaki ............... H01M 50/566 |

FOREIGN PATENT DOCUMENTS

| | | | |
|---|---|---|---|
| JP | 2005-116436 A | 4/2005 | |
| JP | 2016-025013 A | 2/2016 | |
| WO | WO-2012137926 A1 * | 10/2012 | ........ H01M 10/0404 |
| WO | 2017/068703 A1 | 4/2017 | |

OTHER PUBLICATIONS

International Search Report issued in corresponding International Patent Application No. PCT/JP2018/013743 dated May 22, 2018.

\* cited by examiner

*Primary Examiner* — Matthew T Martin
*Assistant Examiner* — Bartholomew A Hornsby
(74) *Attorney, Agent, or Firm* — Morgan, Lewis & Bockius LLP

(57) ABSTRACT

To provide a battery stack forming apparatus and a battery stack forming method that are capable of stacking electric cells with the electric cells accurately maintained in positions.

12 Claims, 14 Drawing Sheets

BATTERY STACK FORMING APPARATUS AND BATTERY STACK FORMING METHOD

TECHNICAL FIELD

The present invention relates to a battery stack forming apparatus and a battery stack forming method.

BACKGROUND ART

A battery module mountable in a vehicle has a battery stack in which a plurality of flat electric cells each including an electrode tab are stacked (see PTL 1). The electrode tab of each electric cell is electrically connected to the electrode tab of another electric cell via an electrically conductive busbar. The electrode tabs and the busbars are joined by laser welding.

The electric cells are stacked in such a manner as to be supported by spacers. When the electric cells are stacked, spacers adjoining each other in the stacking direction come into contact with each other. Packaging materials (such as laminate films) of the electric cells have coupling holes, and the spacers have coupling pins. The coupling pins are inserted through the coupling holes, and tips of the coupling pins are thermally caulked. Accordingly, the spacers and the electric cells are connected. Each spacer has a positioning pin and a positioning hole. The positions of spacers adjoining each other in the stacking direction are determined by the fitting of the positioning pins and the positioning holes.

CITATION LIST

Patent Literature

PTL 1: International Publication No. 20017/068703

SUMMARY OF INVENTION

Technical Problem

When an electrode tab and a busbar are laser-welded, the position of the electrode tab and the position of the busbar need to be managed so as not to generate a gap between the electrode tab and the busbar to maintain high welding quality. It is therefore necessary to stack electric cells with the electric cells accurately maintained in positions.

In the battery stack described in PTL 1, spacers adjoining each other in the stacking direction each have positioning members (a positioning pin and a positioning hole) to determine the positions of the electric cells. However, a clearance is present between the positioning members, and a clearance is also present between the coupling holes in the electric cells and the coupling pins of the spacers. Due to the presence of the clearances, there is variation in the positions of the electric cells although the variation is slight. As a result, there is variation in the positions of the electrode tabs, which may cause some variation in welding quality when the electrode tabs and the busbars are laser-welded.

It is an object of the present invention to provide a battery stack forming apparatus and a battery stack forming method that are capable of stacking electric cells with the electric cells accurately maintained in positions.

Solution to Problem

A battery stack forming apparatus according to the present invention to achieve the object described above is an apparatus for stacking a plurality of flat electric cells, each including an electrode tab and a main body having a power generation element, in a thickness direction of the main body to form a battery stack. The battery stack forming apparatus includes a stacking robot that holds and stacks each of the electric cells, a detection unit that detects positions of reference portions set in at least two locations on the electrode tab of the electric cell held by the stacking robot, a control unit, and a reference block against which the electrode tab is to be relatively pressed. The control unit controls activation of the stacking robot and the detection unit. The control unit holds, using the stacking robot, each of the electric cells, detects, using the detection unit, the positions of the reference portions in a state where an attitude of the electrode tab is corrected by relatively pressing the electrode tab against the reference block, and stacks the electric cell in such a manner that each of the positions of the reference portions is made to coincide with one of stacking reference positions set in advance to form the battery stack.

Further, a battery stack forming method according to the present invention to achieve the object described above is a method for stacking a plurality of flat electric cells, each including an electrode tab and a main body having a power generation element, in a thickness direction of the main body to form a battery stack. The battery stack forming method first detects positions of reference portions set in at least two locations on the electrode tab in a state where an attitude of the electrode tab is corrected by relatively pressing the electrode tab against a reference block.

DESCRIPTION OF EMBODIMENTS

Figure 1:
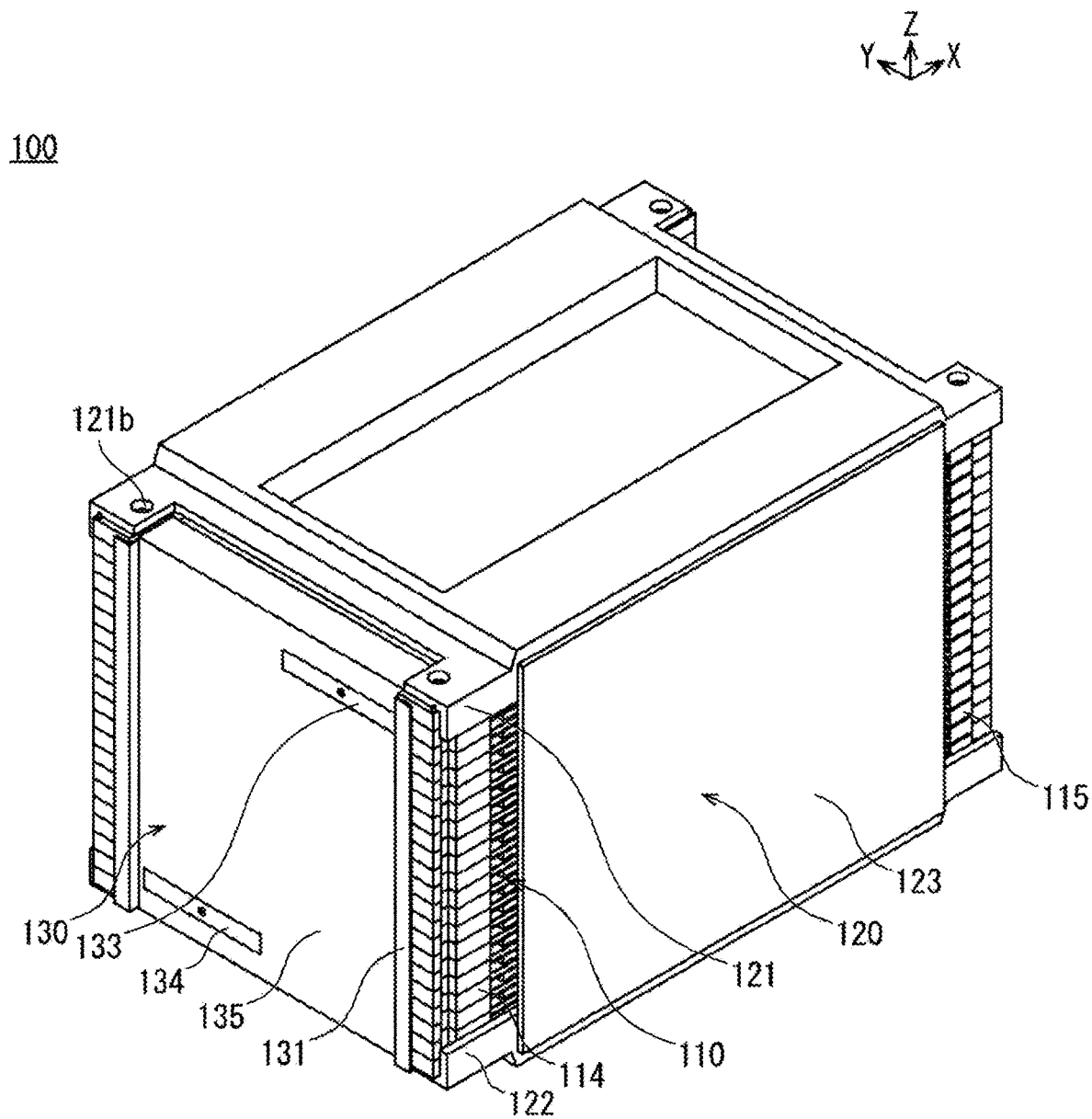
FIG. 1 is a perspective view illustrating a battery module.

The following describes an embodiment of the present invention with reference to the accompanying drawings. In the drawings, the same members are assigned the same numerals, and redundant descriptions are omitted. The figures are not necessarily to scale; the dimensions of some members or the ratios of the dimensions may be exaggerated to facilitate the understanding of the embodiment.

The X-Y-Z axes in the figures define the orientations of a battery module 100. The X axis indicates a direction crossing the stacking direction of electric cells 110 and extending in the long-side direction of the electric cells 110. The Y axis indicates a direction crossing the stacking direction of the electric cells 110 and extending in the short-side direction of the electric cells 110. The Z axis indicates the stacking direction of the electric cells 110.

(Battery Module 100)

First, a battery module including a battery stack will be described.

Figure 2:
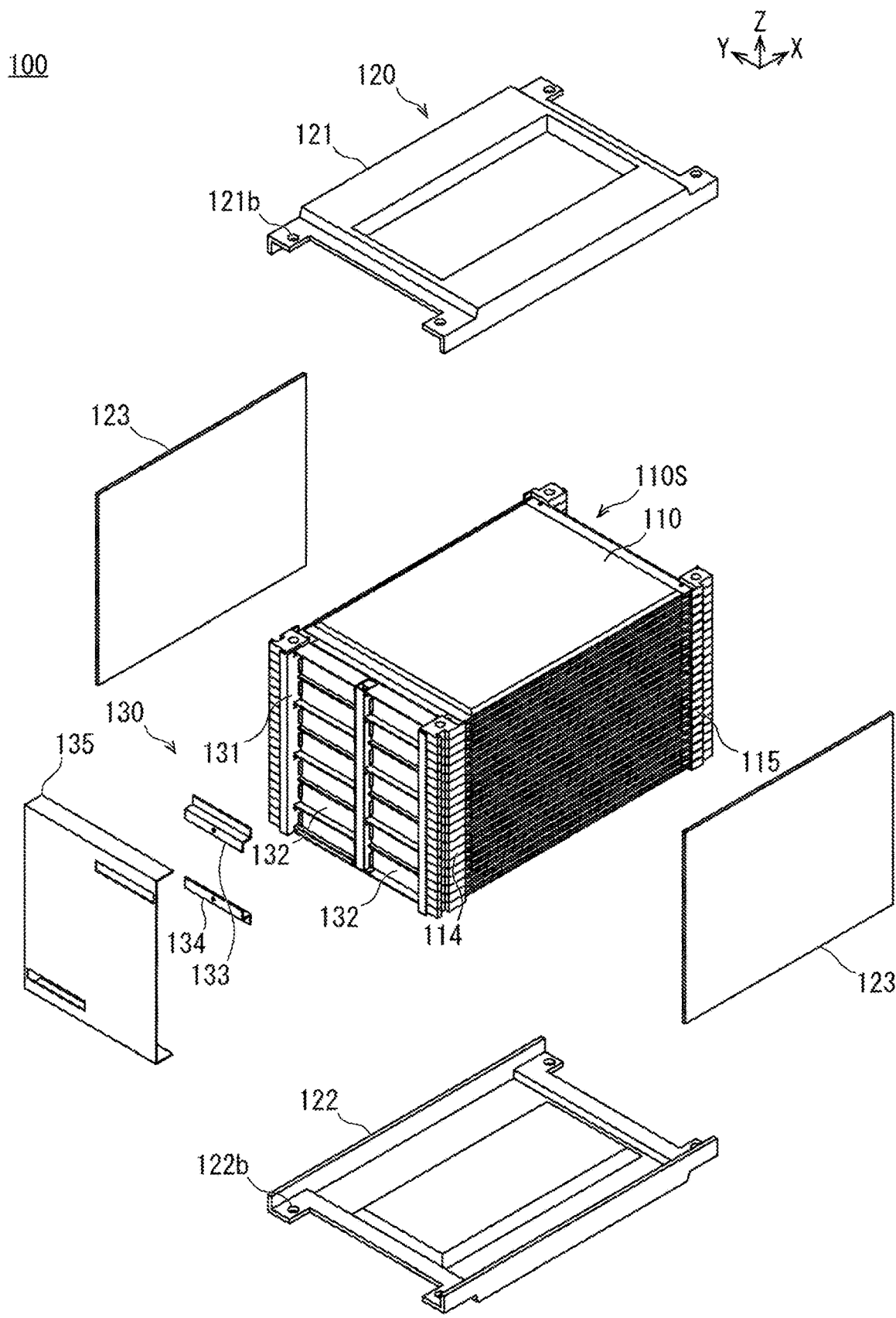
FIG. 2 is a perspective view illustrating the battery module illustrated in FIG. 1, with a portion thereof exploded.

Referring to FIG. 1 and FIG. 2, in the battery module 100, a battery stack 110S having the plurality of flat electric cells 110 stacked on one another is accommodated in a module case 120. The module case 120 is formed of four plate members and also functions as a pressurizing unit that pressurizes the battery stack 110S. The plurality of electric cells 110 are electrically connected by a busbar unit 130 in a state pressurized by the module case 120.

Figure 3A:
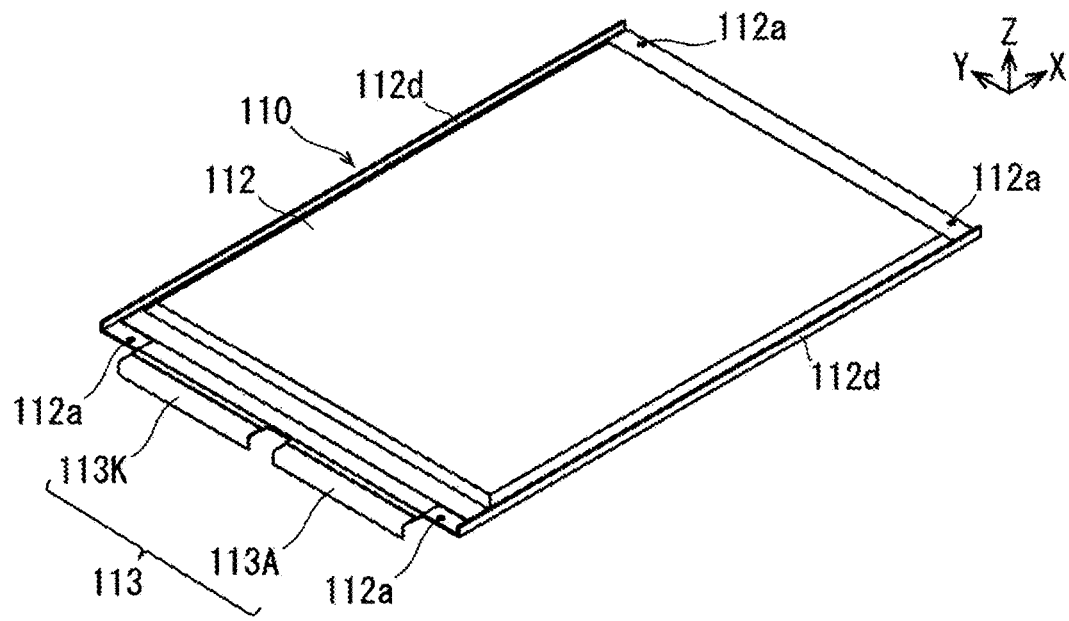
FIG. 3A is a perspective view illustrating a flat electric cell having an electrode tab.
Figure 3B:
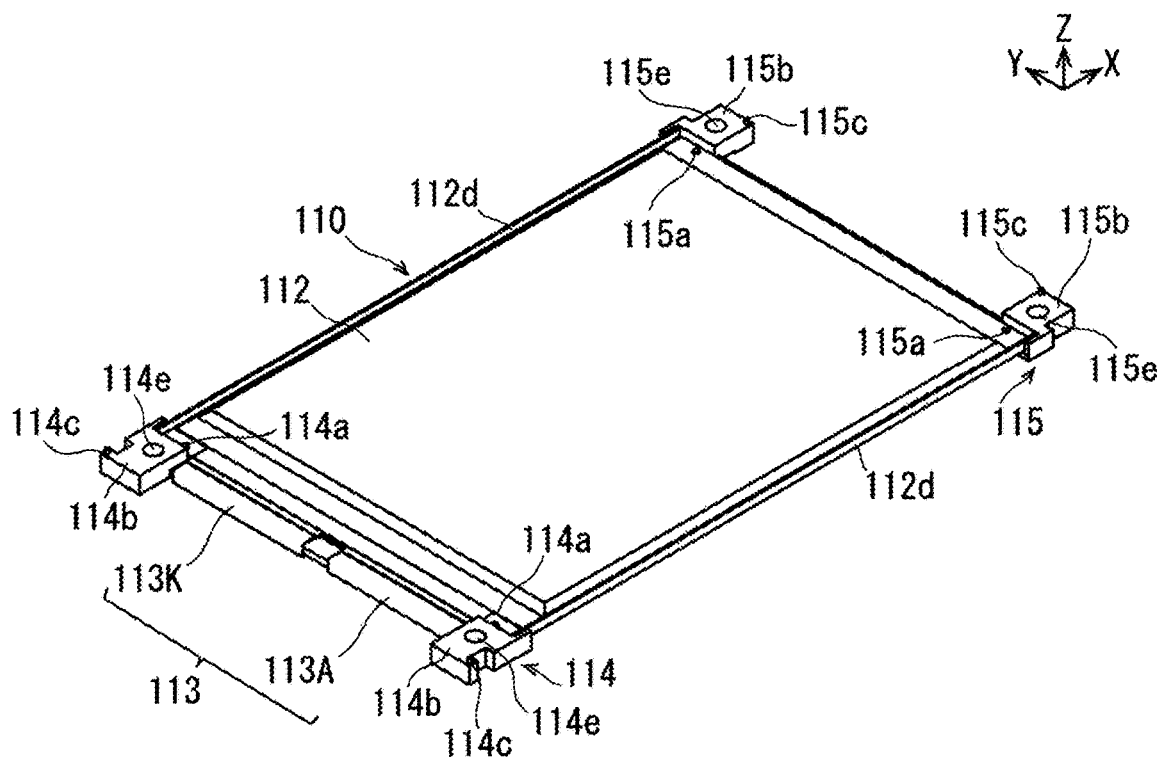
FIG. 3B is a perspective view illustrating the state of the electric cell to which spacers are attached.
Figure 4:
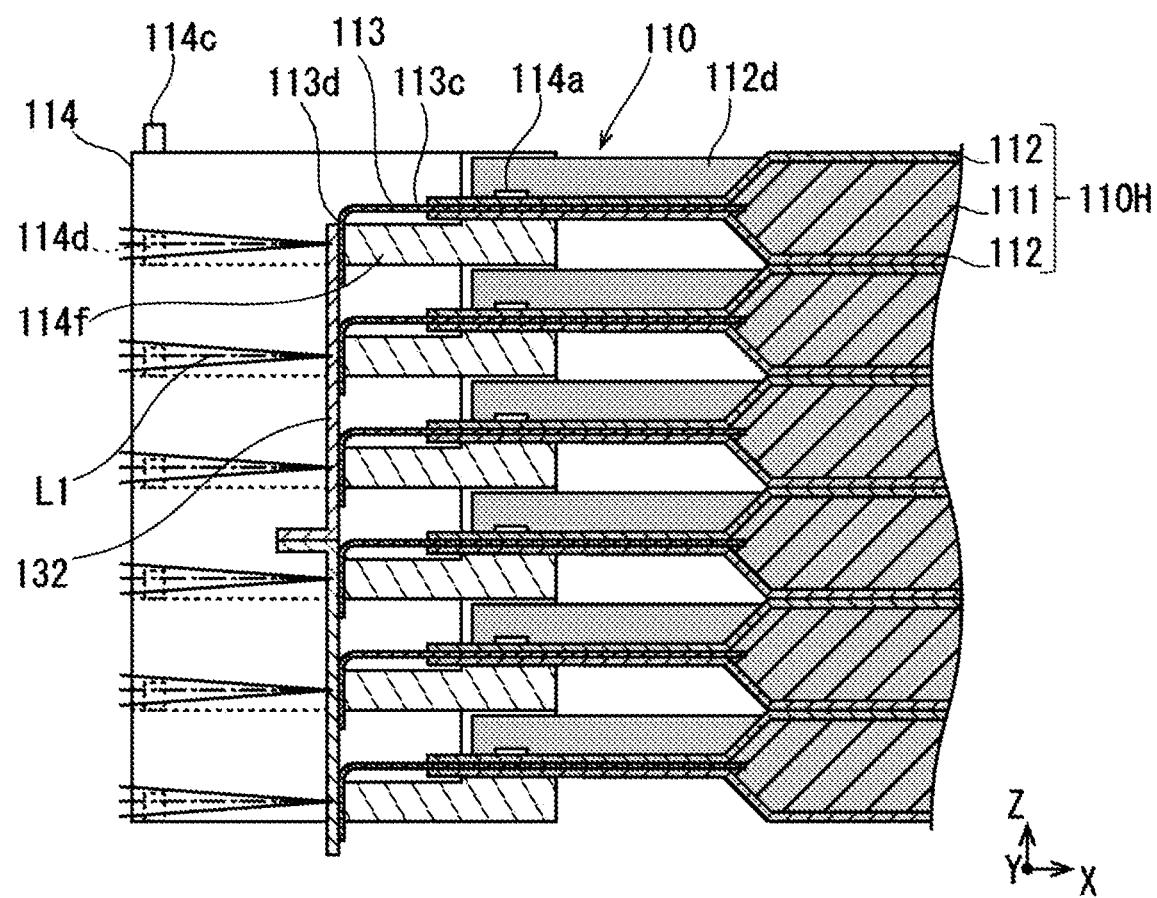
FIG. 4 is a side view illustrating, in section, a main part of electrode tabs of stacked electric cells to which busbars are laser-joined.

Referring to FIG. 3A, FIG. 3B, and FIG. 4, the electric cells 110 are, for example, flat lithium-ion secondary batteries. Each of the electric cells 110 includes a main body 110H in which a power generation element 111 is sealed by a pair of laminate films 112, and a thin plate shaped electrode tab 113. The power generation element 111 has a positive pole layer and a negative pole layer stacked with a separator therebetween. The power generation element 111 is sealed by the laminate films 112 together with an electrolyte solution.

The laminate films 112 are each configured to cover both sides of a metal foil with insulating sheets. The laminate films 112 have coupling holes 112a at four corners thereof. The laminate films 112 are formed such that both ends 112d thereof extending in the long-side direction X bend upward in the stacking direction Z.

The electrode tab 113 is electrically connected to the power generation element 111 and is guided outward from the laminate films 112. The electrode tab 113 has an anode-side electrode tab 113A and a cathode-side electrode tab 113K. The anode-side electrode tab 113A and the cathode-side electrode tab 113K extend in one direction (leftward in FIG. 3A) extending in the long-side direction X from one end of the laminate films 112 in the short-side direction Y.

The electrode tab 113 bends so as to be formed in an L shape from a proximal end portion 113c to a distal end portion 113d. The distal end portion 113d of the electrode tab 113 is formed into a plane shape to face a busbar 132. The shape of the electrode tab 113 is not limited to the illustrated L shape, and the electrode tab 113 has a suitable shape according to the relationship with the busbar 132 in terms of shape. The anode-side electrode tab 113A is formed of, for example, aluminum, and the cathode-side electrode tab 113K is formed of, for example, copper.

Referring to FIG. 3B, the side of each of the electric cells 110 having the electrode tab 113 is supported by a pair of first spacers 114, and the side thereof not having the electrode tab 113 is supported by a pair of second spacers 115. The electric cells 110 are stacked in such a manner as to be supported by the spacers 114 and 115. The first spacers 114 have coupling pins 114a to be inserted through the coupling holes 112a in the laminate films 112, and the second spacers 115 have coupling pins 115a to be inserted through the coupling holes 112a. Tips of the coupling pins 114a and 115a are thermally caulked to connect the spacers 114 and 115 to the laminate films 112. Each of the spacers 114 and 115 is formed of insulating reinforced plastic. Clearances between inner circumferential surfaces of the coupling holes 112a and outer circumferential surfaces of the coupling pins 114a and 115a are relatively large. Accordingly, fitting of the coupling holes 112a and the coupling pins 114a and 115a does not prevent correction of the attitudes or positions of the electric cells 110.

The first spacers 114 have placement portions 114b at both ends in the long-side direction thereof (the short-side direction Y), and the second spacers 115 have placement portions 115b at both ends in the long-side direction thereof (the short-side direction Y). When the electric cells 110 are stacked, the placement portions 114b of the first spacers 114 that adjoin each other in the stacking direction come into contact with each other, and the placement portions 115b of the second spacers 115 that adjoin each other in the stacking direction come into contact with each other. The placement portions 114b and 115b have pins 114c and 115c on upper surfaces thereof, respectively. The placement portions 114b have holes 114d in lower surfaces thereof at corresponding positions of the pins 114c (see FIG. 4). Likewise, the placement portions 115b have holes (not illustrated) in lower surfaces thereof at corresponding positions of the pins 115c. Clearances between inner circumferential surfaces of the holes 114d and outer circumferential surfaces of the pins 114c and 115c are relatively large. Accordingly, fitting of the holes 114d and the pins 114c and 115c does not prevent correction of the attitudes or positions of the electric cells 110. The placement portions 114b and 115b have through-holes 114e and 115e through which through bolts are inserted. As illustrated in FIG. 4, the first spacers 114 have a supporting portion 114f that supports the distal end portion 113d of the electrode tab 113 from the side opposite to the busbar 132.

The module case 120 includes an upper pressure application plate 121 and a lower pressure application plate 122 that apply pressure to the power generation elements 111 of the electric cells 110 in the battery stack 110S from the top and the bottom, respectively, and a pair of side plates 123 that fix the upper pressure application plate 121 and the lower pressure application plate 122 in a state of applying pressure to the battery stack 110S. The upper pressure application plate 121 has locating holes 121b through which fastening bolts are inserted to fix the battery module 100 to a pack case (not illustrated). Likewise, the lower pressure application plate 122 has locating holes 122b through which fastening bolts are inserted. The pair of side plates 123 are welded to the upper pressure application plate 121 and the lower pressure application plate 122. A material used to form the module case 120 can include, for example, but not limited to, stainless steel.

The busbar unit 130 includes the busbars 132 that electrically connect the electrode tabs 113 of the vertically arranged electric cells 110 to each other, a busbar holder 131 that integrally holds the plurality of busbars 132, and a protection cover 135 that protects the busbars 132. The busbar unit 130 further includes an anode-side side terminal 133 that makes the anode-side ends of the plurality of electrically connected electric cells 110 face external input/output terminals, and a cathode-side terminal 134 that makes the cathode-side ends thereof face external input/output terminals.

As illustrated in FIG. 4, to laser-join the busbars 132 to the electrode tabs 113 of the stacked electric cells, a laser oscillator (not illustrated) applies laser light L1 to the busbars 132. The busbars 132 and the distal end portions 113d of the electrode tabs 113 are joined by seam welding or spot welding. When the electrode tabs 113 and the busbars 132 are laser-welded, the positions of the electrode tabs 113 and the positions of the busbars 132 need to be managed so as not to generate gaps between the electrode tabs 113 and the busbars 132 to maintain high welding quality. It is therefore necessary to stack the electric cells 110 with the electric cells 110 accurately maintained in positions.

(Battery Stack Forming Apparatus 10)

Figure 5A:
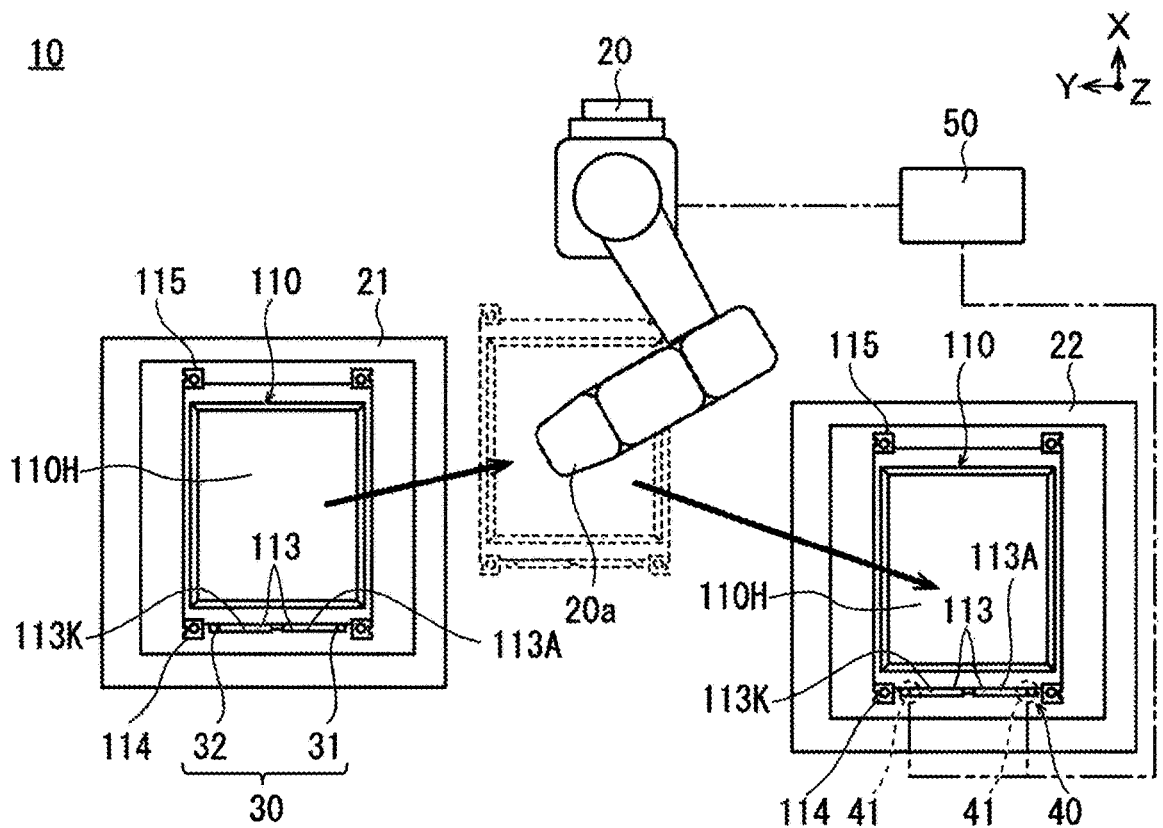
FIG. 5A is a plan view schematically illustrating a configuration of a battery stack forming apparatus.
Figure 5B:
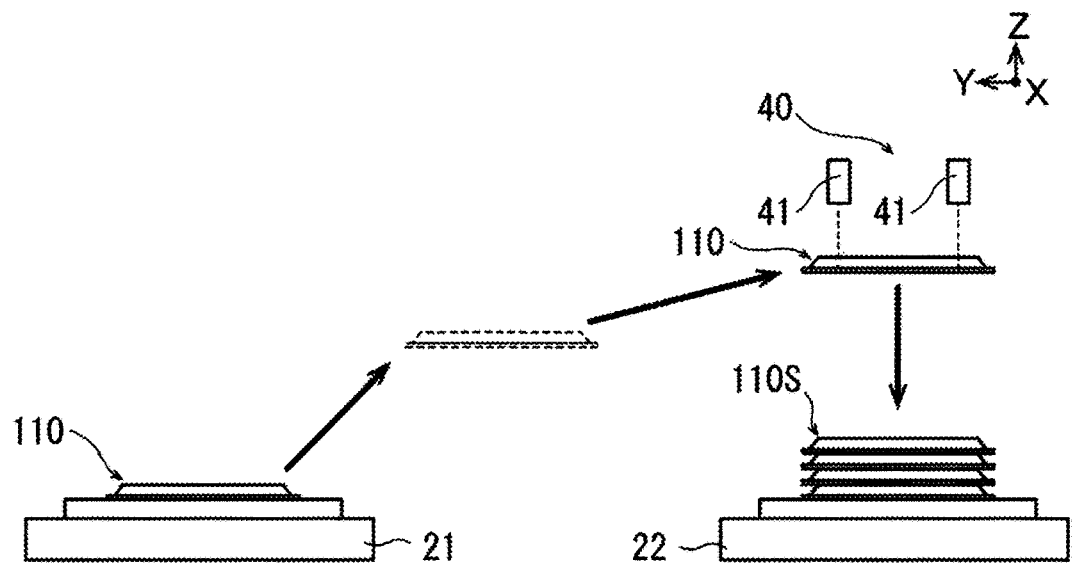
FIG. 5B is a side view schematically illustrating how electric cells are stacked by using the battery stack forming apparatus.
Figure 6A:
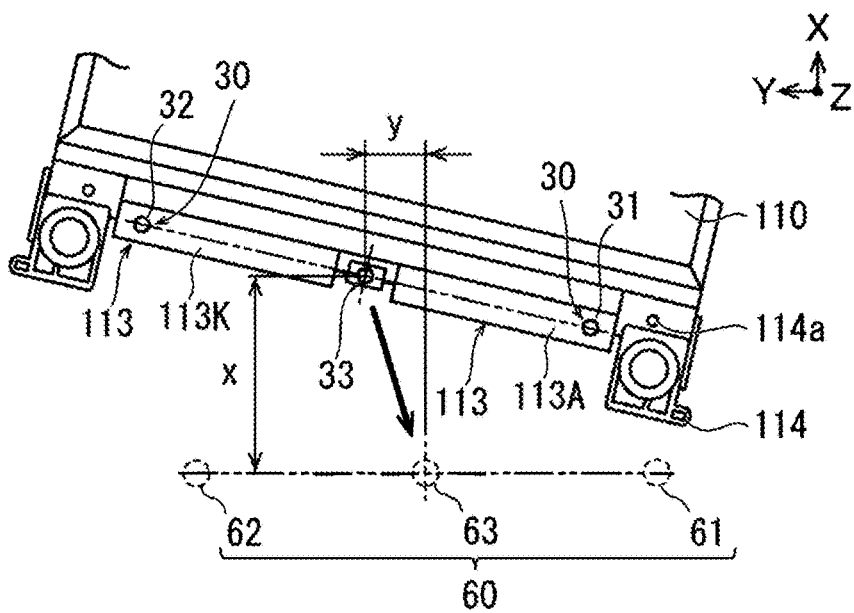
FIG. 6A is an explanatory diagram illustrating the state of an electric cell before the attitude thereof is corrected.
Figure 6B:
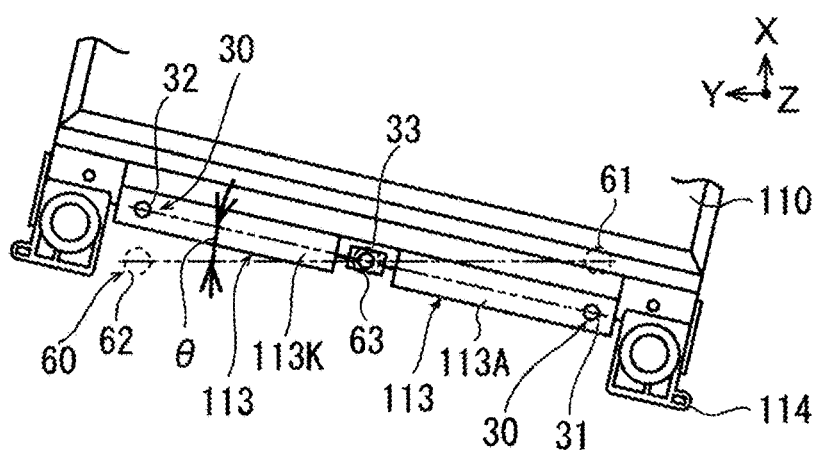
FIG. 6B is an explanatory diagram illustrating the state of the electric cell that has been corrected in two X- and Y-axis directions.
Figure 6C:
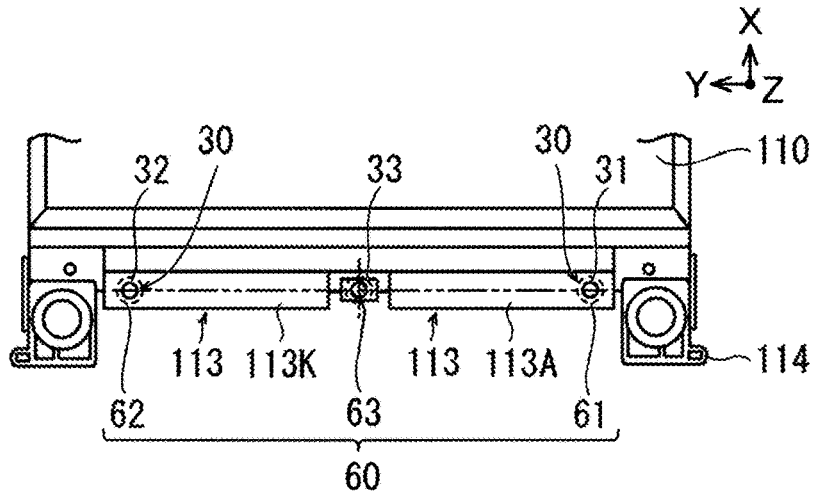
FIG. 6C is an explanatory diagram illustrating the state of the electric cell that has been rotated about the Z axis for correction after FIG. 6B.

A battery stack forming apparatus 10 according to an embodiment will be described. FIG. 5A is a plan view schematically illustrating a configuration of the battery stack forming apparatus 10, and FIG. 5B is a side view schematically illustrating how the electric cells 110 are stacked by using the battery stack forming apparatus 10. FIG. 6A is an explanatory diagram illustrating the state of an electric cell 110 before the attitude thereof is corrected, FIG. 6B is an explanatory diagram illustrating the state of the electric cell 110 that has been corrected in two X- and Y-axis directions, and FIG. 6C is an explanatory diagram illustrating the state of the electric cell 110 that has been rotated about the Z axis for correction after FIG. 6B.

Generally, the battery stack forming apparatus 10 is an apparatus for stacking a plurality of flat electric cells 110, each including an electrode tab 113 and a main body 110H having a power generation element 111, in a thickness direction of the main body 110H to form a battery stack 110S. The battery stack forming apparatus 10 includes a stacking robot 20 that holds and stacks each of the electric cells 110, and a detection unit 40 that detects positions of reference portions 30 set in at least two locations on the electrode tab 113 of the electric cell 110 held by the stacking robot 20. The battery stack forming apparatus 10 further includes a control unit 50 that controls activation of the stacking robot 20 and the detection unit 40. The control unit 50 holds, using the stacking robot 20, each of the electric cells 110 and detects, using the detection unit 40, the positions of the reference portions 30. Then, the control unit 50 stacks the electric cell 110 in such a manner that each of the positions of the reference portions 30 is made to coincide with one of stacking reference positions 60 set in advance to form the battery stack 110S. A detailed description will be given hereinafter.

The stacking robot 20 is constituted by a typical industrial robot. For example, a horizontally articulated robot (SCARA) having an arm operable in the horizontal direction, or the like may be used. The stacking robot 20 holds an electric cell 110 fed on a feed table 21, corrects the attitude of the held electric cell 110, and then stacks the electric cell 110 one after another on a jig 22 for forming the battery stack 110S. The electric cell 110 to be stacked is fed onto the feed table 21 using a robot or a conveyor belt (not illustrated) or the like.

As illustrated in FIG. 4, the electrode tab 113 bends so as to be formed in an L shape from the proximal end portion 113c to the distal end portion 113d. The distal end portion 113d of the electrode tab 113 is formed into a plane shape to face the busbar 132.

The electrode tab 113 includes the reference portions 30 that are set in at least two locations. The configuration of the reference portions 30 is not limited so long as their positions can be identified. The reference portions 30 may be each formed by, for example, a through-hole, a blind hole, a cutout, an imprinted mark, or the like.

In the illustrated example, the reference portions 30 of the electrode tab 113 include a first reference portion 31 and a second reference portion 32. The first reference portion 31 and the second reference portion 32 are formed by throughholes. The first reference portion 31 and the second reference portion 32 are formed in the proximal end portion 113c of the electrode tab 113. The proximal end portion 113c is located in a horizontal plane. In the following description, the first reference portion 31 is referred to as a first inspection hole 31, and the second reference portion 32 is referred to as a second inspection hole 32. The anode-side electrode tab 113A has the first inspection hole 31, and the cathode-side electrode tab 113K has the second inspection hole 32. The first inspection hole 31 and the second inspection hole 32 are formed away from each other as much as possible so that a line segment connecting the center of the first inspection hole 31 and the center of the second inspection hole 32 is long. This is because the accuracy of correcting the position of the electric cell 110 improves. Referring to FIG. 6C, the first inspection hole 31 is formed to be closer to the right end of the anode-side electrode tab 113A, and the second inspection hole 32 is formed to be closer to the left end of the cathode-side electrode tab 113K.

The configuration of the detection unit 40 is not limited so long as the detection unit 40 is capable of detecting the position of the reference portions 30. In the illustrated example, the detection unit 40 has cameras 41 equipped with CCD image sensors. The detection unit 40 includes a processing unit that performs image processing on image data captured by the cameras 41. The detection unit 40 performs image analysis on the captured image data using the processing unit to detect the respective positions of the first inspection hole 31 and the second inspection hole 32.

The control unit 50 is mainly constituted by a CPU and a memory and controls activation of the stacking robot 20 or the detection unit 40. The control unit 50 receives input of the respective pieces of position data of the first inspection hole 31 and the second inspection hole 32 detected by the detection unit 40. The control unit 50 also functions as a processing unit for the detection unit 40. The control unit 50 receives input of image data captured by the cameras 41 and performs image analysis of the image data to detect the respective positions of the first inspection hole 31 and the second inspection hole 32. The control unit 50 controls activation of the stacking robot 20 to correct the attitude of the electric cell 110 held by the stacking robot 20. The correction is performed in such a manner that each of the positions of the first inspection hole 31 and the second inspection hole 32 is made to coincide with one of the respective stacking reference positions 60 set in advance to form the battery stack 110S. The control unit 50 controls activation of the stacking robot 20 to stack the electric cell 110, whose attitude has been corrected, one after another.

Although not illustrated, a bonding agent or an adhesive is applied between the electric cells 110 to be stacked.

As described above, the spacers 114 and 115 are coupled to the laminate films 112. However, clearances between the inner circumferential surfaces of the coupling holes 112a and the outer circumferential surfaces of the coupling pins 114a and 115a are relatively large. Accordingly, fitting of the coupling holes 112a and the coupling pins 114a and 115a does not prevent correction of the attitudes or positions of the electric cells 110. Further, the placement portions 114b and 115b of the spacers 114 and 115 that adjoin each other in the stacking direction are coupled to each other. However, clearances between the inner circumferential surfaces of the holes 114d and the outer circumferential surfaces of the pins 114c and 115c are relatively large. Accordingly, fitting of the holes 114d and the pins 114c and 115c does not prevent correction of the attitudes or positions of the electric cells 110.

The correction for the attitude of each of the electric cells 110 will be described with reference to FIG. 6A, FIG. 6B, and FIG. 6C.

As described above, the reference portions 30 of the electrode tab 113 include the first inspection hole 31 and the second inspection hole 32. The stacking reference positions 60 include a first reference position 61 for positioning the first inspection hole 31, a second reference position 62 for positioning the second inspection hole 32, and a third reference position 63 for positioning the midpoint of a line segment connecting the first reference position 61 and the second reference position 62. The control unit 50 determines the position of a midpoint 33 of a line segment connecting the first inspection hole 31 and the second inspection hole 32 based on the center position of the first inspection hole 31 and the center position of the second inspection hole 32 that are detected.

As illustrated in FIG. 6A, first, the control unit 50 determines an amount of correction x (mm) in the X direction and an amount of correction y (mm) in the Y direction, which are necessary to position the midpoint 33 at the third reference position 63. After the midpoint 33 is positioned at the third reference position 63, the control unit 50 further determines an amount of correction θ (degree) in the rotation direction, which is necessary to position the first inspection hole 31 at the first reference position 61 and to position the second inspection hole 32 at the second reference position 62.

Then, as illustrated in FIG. 6B, the control unit 50 controls activation of the stacking robot 20 to correct the attitude of the electric cell 110 held by the stacking robot 20 in the two X- and Y-axis directions. The amounts of correction are the amount of correction x (mm) in the X direction and the amount of correction y (mm) in the Y direction.

Then, as illustrated in FIG. 6C, the control unit 50 controls activation of the stacking robot 20 to rotate the attitude of the electric cell 110 held by the stacking robot 20 about the Z axis for correction. The amount of correction is the amount of correction θ (degree).

In this way, the control unit 50 controls activation of the stacking robot 20 to correct the position of the electric cell 110 so that the first inspection hole 31, the second inspection hole 32, and the midpoint 33 are made to coincide with the first reference position 61, the second reference position 62, and the third reference position 63, respectively.

Figure 7:
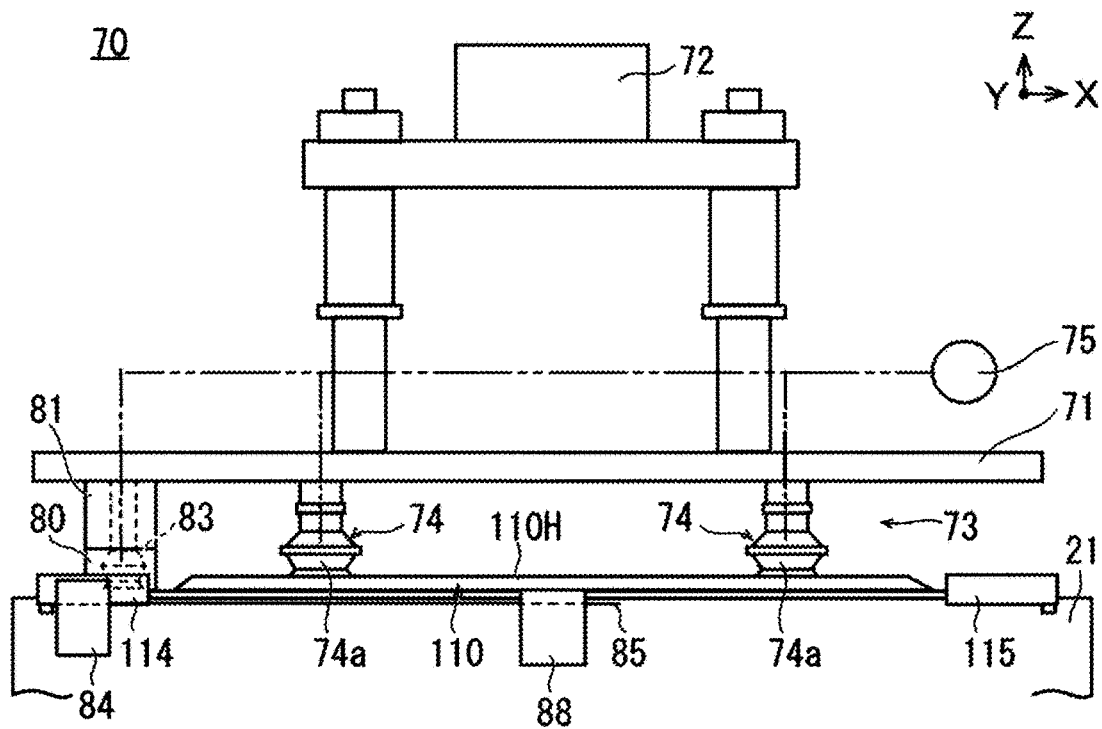
FIG. 7 is a side view illustrating a main part of the battery stack forming apparatus.
Figure 8:
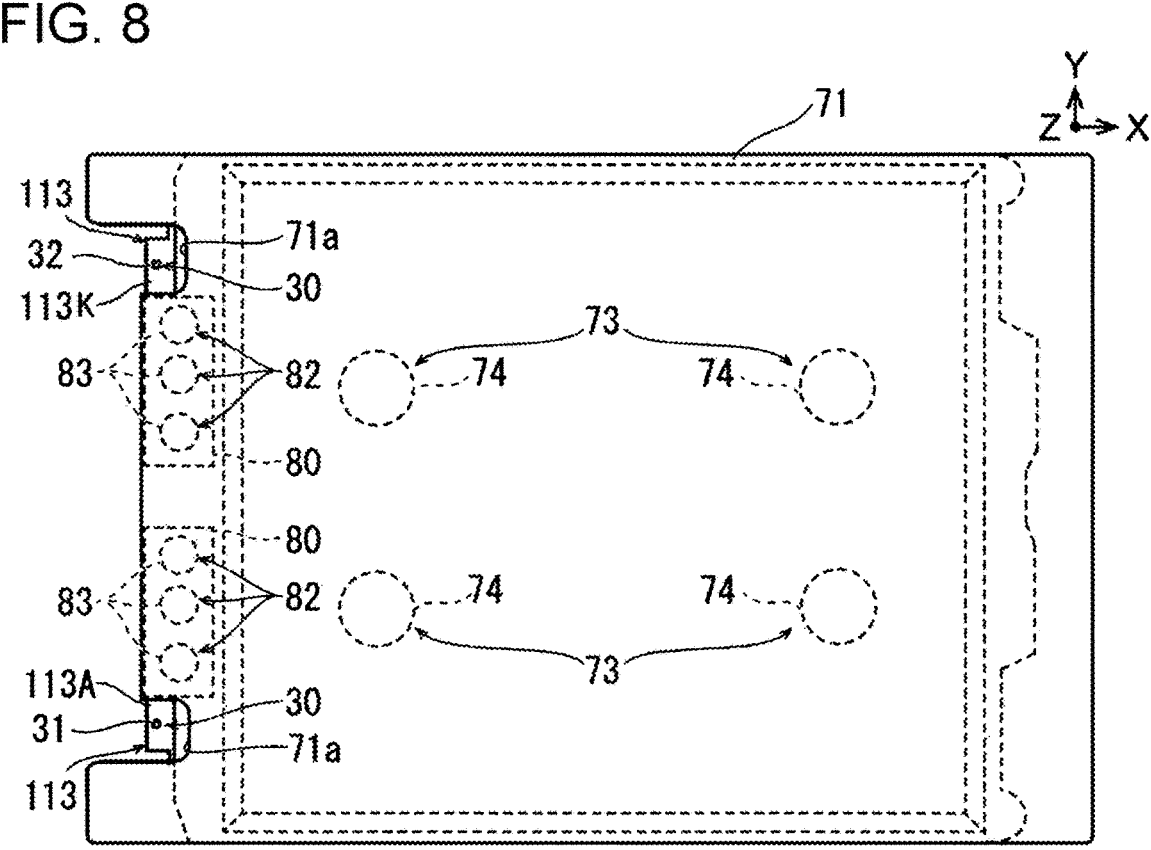
FIG. 8 is a plan view illustrating a top plate portion of the battery stack forming apparatus.
Figure 9:
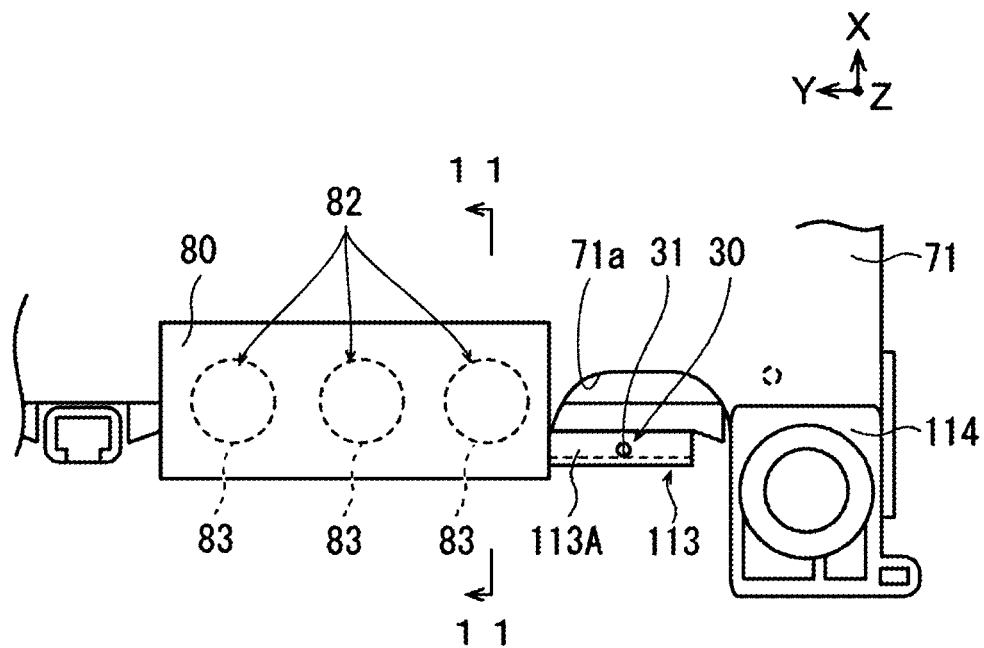
FIG. 9 is a plan view illustrating the main part of the battery stack forming apparatus.

Referring to FIG. 7, FIG. 8, and FIG. 9, in the battery stack forming apparatus 10, a handling unit 70 is connected to the tip of a robot arm 20a (see FIG. 5A) to handle an electric cell 110. The handling unit 70 has a top plate 71, a connection unit 72 located on the upper surface side of the top plate 71 and configured to be connected to the robot arm 20a, and a holding unit 73 located on the lower surface side of the top plate 71 and capable of holding and releasing the electric cell 110.

The top plate 71 has dents 71a along the edge thereof on the electrode tab 113 side to expose portions of the electrode tab 113 around the first inspection hole 31 and the second inspection hole 32, as seen from above. Through the dents 71a, images of the first inspection hole 31, the second inspection hole 32, and the portions of the electrode tab 113 around the inspection holes 31 and 32 can be captured from above using the cameras 41.

The holding unit 73 holds the upper surface side of the main body 110H of the electric cell 110 at four locations. The holding unit 73 has main-body suction pads 74 on which the main body 110H is to be sucked. The main-body suction pads 74 have flexible pleated covers 74a. The covers 74a have inner spaces communicating with a suction device 75 such as a vacuum pump. When the stacking robot 20 moves the handling unit 70 downwards toward the electric cell 110 on the feed table 21, the lower edges of the covers 74a come into contact with the upper surface of the main body 110H. When the stacking robot 20 further moves the handling unit 70 downwards, the covers 74a of the main-body suction pads 74 are elastically deformed, causing the lower edges of the covers 74a to be pressed against the upper surface of the main body 110H. In this state, the suction device 75 is activated. Due to the negative pressure, the main body 110H is sucked on the main-body suction pads 74. As a result, the upper surface of the main body 110H is adsorbed and held. When the stacking robot 20 finishes stacking the electric cell 110 on the jig 22, the activation of the suction device 75 is stopped, and the inside of the main-body suction pads 74 is left open to the air. This cancels adsorption and holding of the main body 110H.

Figure 12:
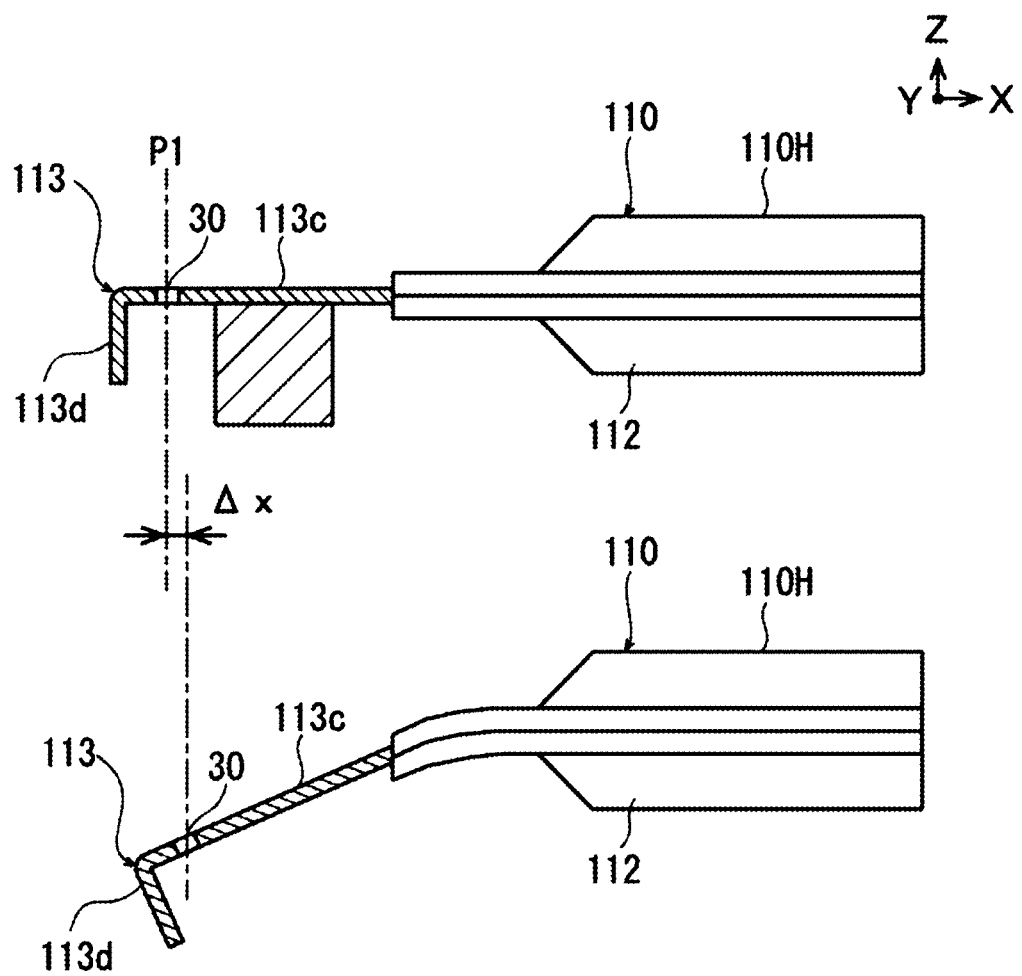
FIG. 12 is a sectional view describing the necessity to correct the attitude of the electrode tab when detecting the position of a reference portion.

The electrode tab 113 is relatively rigid. In contrast, the laminate films 112, which are typically used as a packaging material, are flexible. A current collecting foil of the power generation element 111 to which the electrode tab 113 is to be connected is very thin and is much less rigid than the electrode tab 113. Accordingly, as illustrated in FIG. 12, when the electric cell 110 is lifted for handling, the distal end portion 113d of the electrode tab 113 hangs down lower than the main body 110H. In this state, if the reference portions 30 are detected from above, an error of Δx relative to a true position P1 is generated. It is necessary to stabilize the attitude of the electrode tab 113 during the image capturing operation to reduce the variation in image position correction. It is therefore necessary to correct the attitude of the electrode tab 113 when handling the electric cell 110 and detecting the respective positions of the reference portions 30 using the detection unit 40.

Accordingly, the battery stack forming apparatus 10 further includes reference blocks 80 against which the electrode tab 113 is to be relatively pressed. The detection unit 40 detects the respective positions of the reference portions 30 in a state where the attitude of the electrode tab 113 is corrected by relatively pressing the electrode tab 113 against the reference blocks 80. The correction of the attitude of the electrode tab 113 enables correct detection of the respective positions of the reference portions 30.

The reference blocks 80 are arranged at the respective positions of the anode-side electrode tab 113A and the cathode-side electrode tab 113K. The reference blocks 80 are attached to the lower surface of the top plate 71 via attachment blocks 81. Lower surfaces 80a of the reference blocks 80 are surfaces against which the electrode tab 113 is to be relatively pressed. In this embodiment, the reference blocks 80 are attached to the top plate 71, and the reference blocks 80 are installed in the stacking robot 20. This enables correction of the attitude of the electrode tab 113 during a period from when the electric cell 110 is held to when the electric cell 110 is moved to the position of the detection unit 40.

Figure 10:
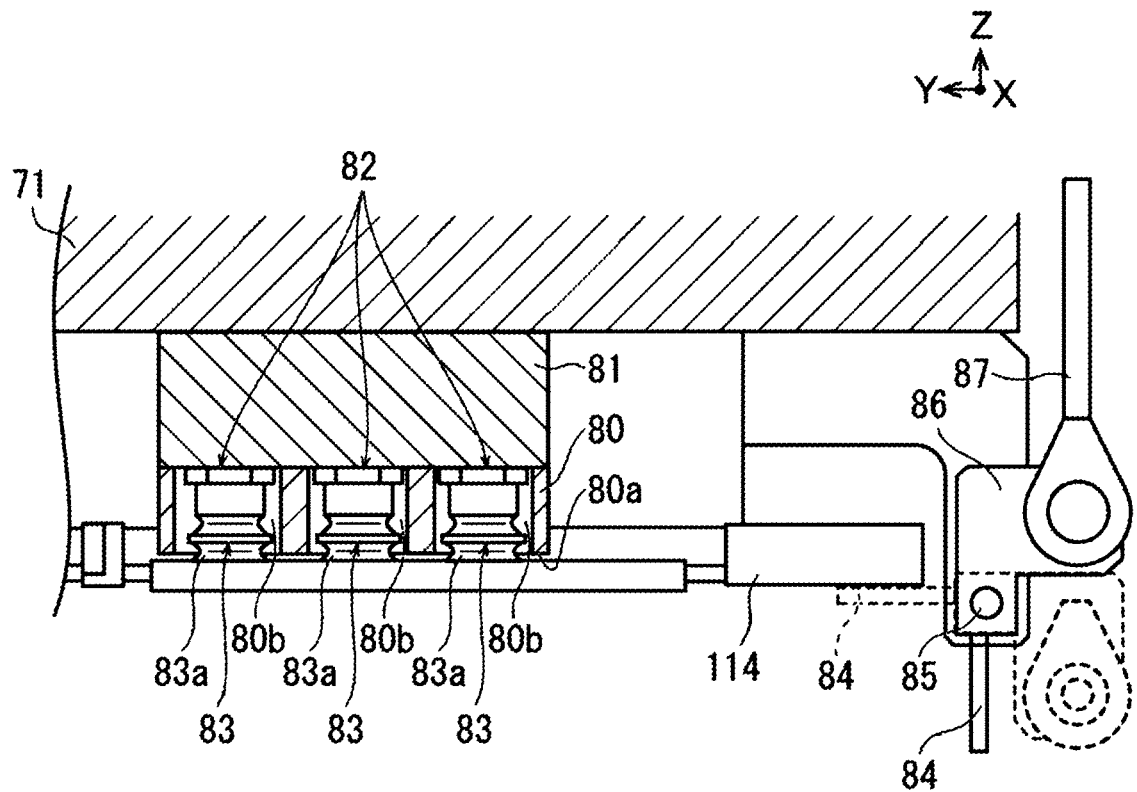
FIG. 10 is a front view illustrating the main part of the battery stack forming apparatus.

Referring to FIG. 10, the battery stack forming apparatus 10 further includes a pressing unit 82 that relatively presses the electrode tab 113 against the reference blocks 80. The pressing unit 82 has tab suction pads 83 (corresponding to suction pads) on which the electrode tab 113 is to be sucked from the reference blocks 80 side. The pressing unit 82 further has holding plates 84 to hold the lower surface side of the electrode tab 113 of the electric cell 110.

Each of the reference blocks 80 has three recesses 80b having open lower surfaces. Each of the three recesses 80b has one of the tab suction pads 83 arranged therein. The three tab suction pads 83 hold the upper surface side of the electrode tab 113. The tab suction pads 83 have flexible pleated covers 83a. The covers 83a have inner spaces communicating with the suction device 75.

Figure 11A:
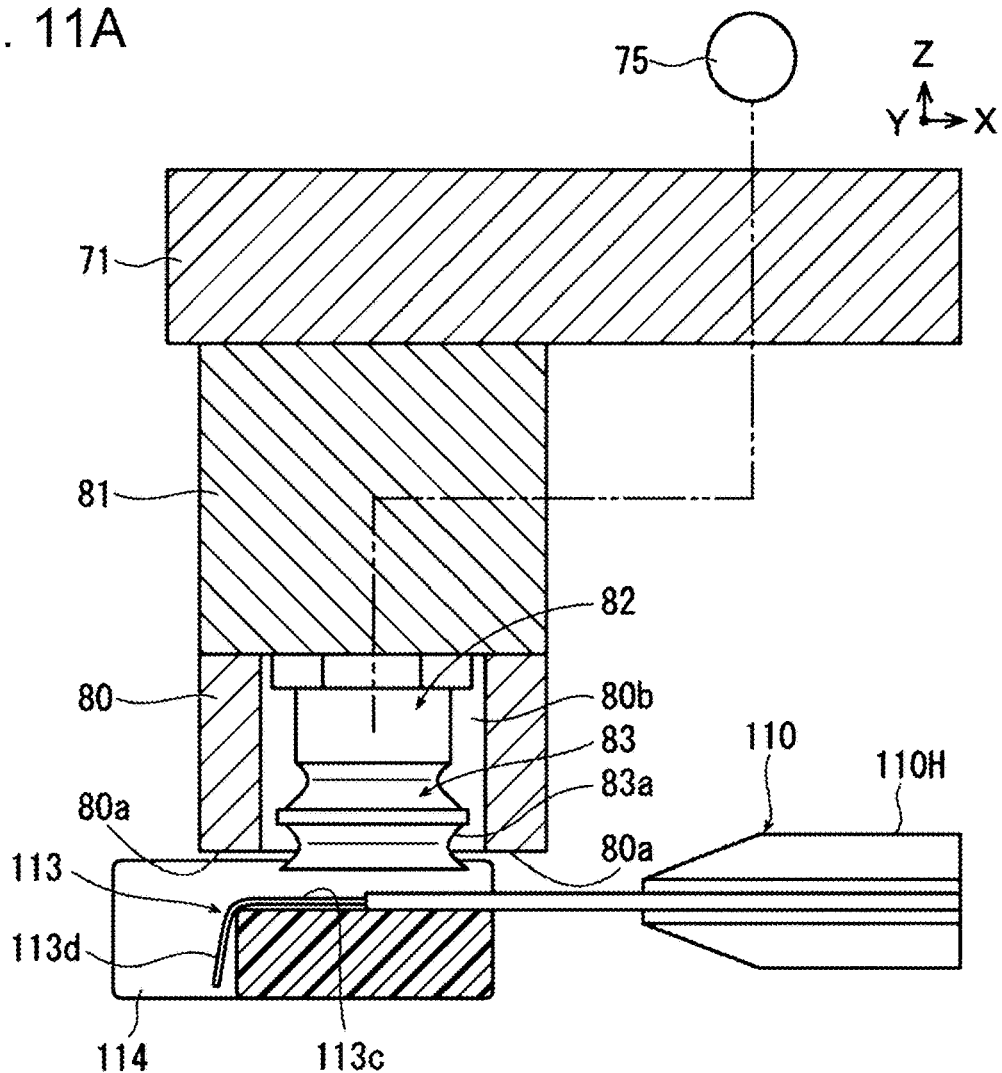
FIG. 11A is a sectional view taken along line 11-11 of FIG. 9 and is a sectional view illustrating the state before an electrode tab is sucked on a tab suction pad of a pressing unit.

As illustrated in FIG. 11A, in the state before the electrode tab 113 is sucked on the tab suction pads 83, the lower edges of the covers 83a of the tab suction pads 83 extend downward beyond the lower surface 80a of the reference block 80. When the stacking robot 20 moves the handling unit 70 downwards toward the electric cell 110 on the feed table 21, the lower edges of the covers 83a come into contact with the upper surface of the electrode tab 113.

Figure 11B:
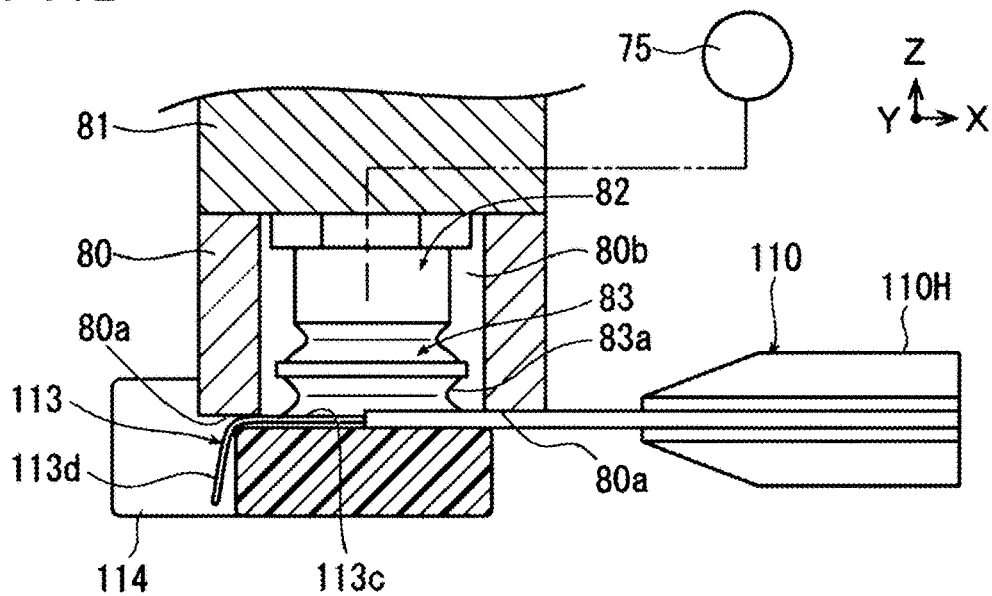
FIG. 11B is a sectional view taken along line 11-11 of FIG. 9 and is a sectional view illustrating the state in which the electrode tab is sucked on the tab suction pad of the pressing unit such that the electrode tab is pressed against a reference block of a detection unit.

As illustrated in FIG. 11B, when the stacking robot 20 further moves the handling unit 70 downwards, the covers 83a of the tab suction pads 83 are elastically deformed, causing the lower edges of the covers 83a to be pressed against the upper surface of the electrode tab 113. In this state, the suction device 75 is activated. Due to the negative pressure, the electrode tab 113 is sucked on the tab suction pads 83. As a result, the upper surface of the electrode tab 113 is adsorbed and held. Further, to suck the electrode tab 113 on the tab suction pads 83 from the reference block 80 side, the electrode tab 113 is pressed against the lower surface 80a of the reference block 80. The reference block 80 is arranged above the electrode tab 113, and the electrode tab 113 operates so as to be pushed up toward the reference block 80. This enables the electrode tab 113, which is warped upward, to be corrected to a stable attitude (horizontally extending attitude).

As illustrated in FIG. 7 and FIG. 10, the holding plates 84 are arranged to face each other along ends of the electric cell 110 extending in the long-side direction (X direction) thereof. The holding plates 84 are attached to drive shafts 85 extending in the X direction and are disposed to be rotatable about the drive shafts 85. Drive plates 86 fixed to the drive shafts 85 are coupled to activation rods 87 of actuators. The actuators are fluid-pressure cylinders such as hydraulic cylinders. As indicated by solid lines in FIG. 10, in a state where the activation rods 87 are pulled up, the holding plates 84 rotate to downward extending positions. In this state, the holding plates 84 cancel the holding of the lower surface side of the electrode tab 113. On the other hand, as indicated by broken lines in FIG. 10, in a state where the activation rods 87 are pressed down, the holding plates 84 rotate to horizontally extending positions. In this state, the holding plates 84 hold the lower surface side of the electrode tab 113 via the first spacers 114. The holding plates 84 hold the lower surface side of the electrode tab 113 to press the electrode tab 113 against the reference blocks 80. The holding plates 84 allow the electrode tab 113 that hangs down to be corrected to a stable attitude (horizontally extending attitude).

As illustrated in FIG. 7, the battery stack forming apparatus 10 has main-body holding plates 88 to hold the lower surface side of the main body 110H. The main-body holding plates 88 are arranged to face each other along ends of the electric cell 110 extending in the long-side direction (X direction) thereof. The main-body holding plates 88 are attached to the drive shafts 85 and are disposed to be rotatable about the drive shafts 85. The main-body holding plates 88 rotate in synchronization with the holding plates 84. When the holding plates 84 hold the lower surface side of the electrode tab 113, the main-body holding plates 88 also hold the lower surface side of the main body 110H. On the other hand, when the holding plates 84 cancel the holding of the lower surface side of the electrode tab 113, the main-body holding plates 88 also cancel the holding of the lower surface side of the main body 110H. The main-body holding plates 88 hold the lower surface side of the main body 110H, which can prevent the electric cell 110 from dropping off from the holding unit 73 when the handling unit 70 moves. Accordingly, the stacking robot 20 moves the electric cell 110 at a high rate, thereby allowing the electric cell 110 to be rapidly stacked. Therefore, the productivity of the battery stack 110S improves.

(Procedure for Stacking Electric Cells 110 by Using Battery Stack Forming Apparatus 10)

Figure 13:
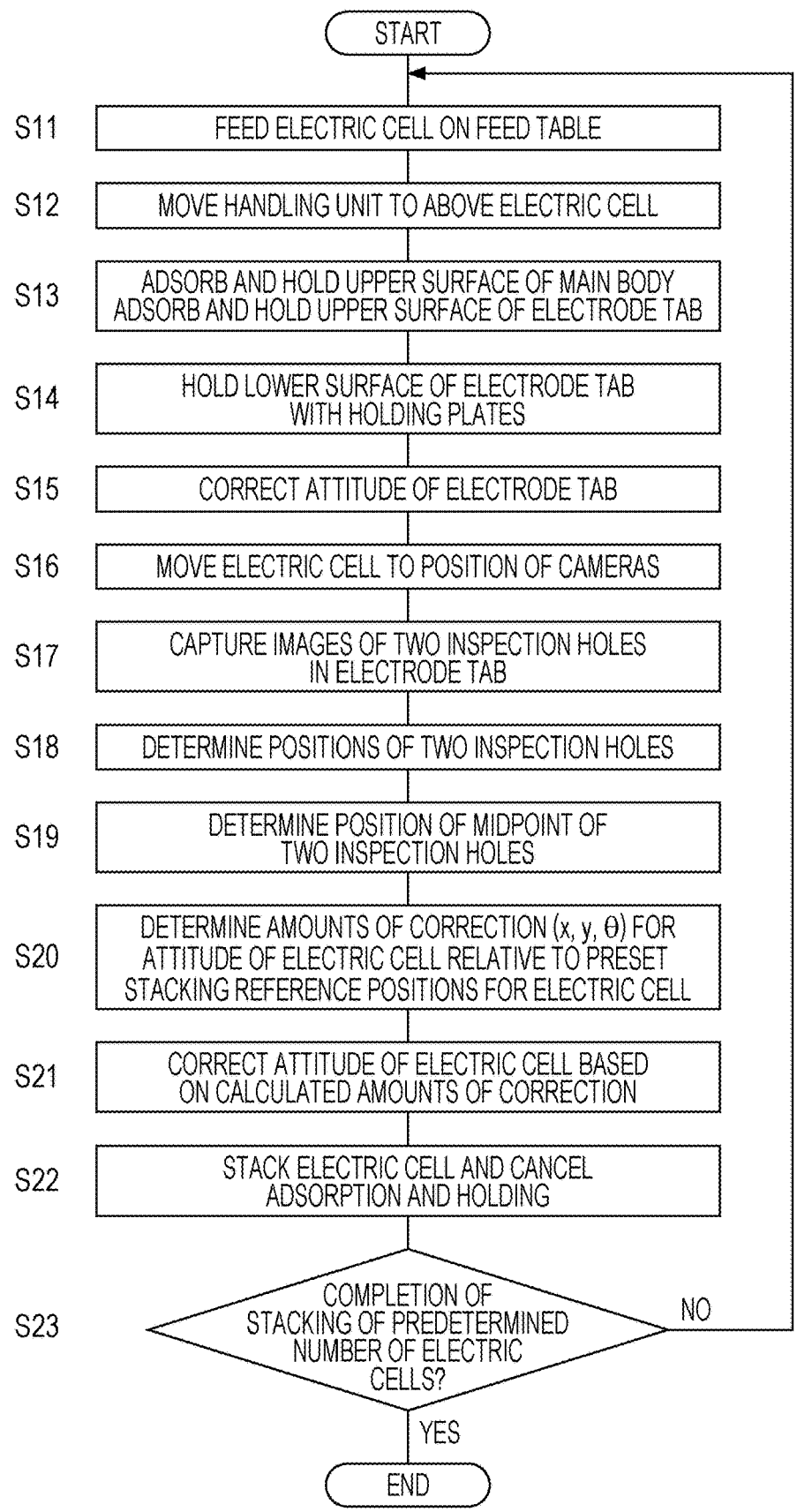
FIG. 13 is a flowchart illustrating a procedure for stacking electric cells with reference to the positions of electrode tabs by using the battery stack forming apparatus.

Next, the procedure for stacking the electric cells 110 by using the battery stack forming apparatus 10 will be described with reference to FIG. 13.

In step S11, a stacking target electric cell 110 is fed onto the feed table 21.

In step S12, the control unit 50 controls activation of the stacking robot 20 to move the handling unit 70 at the tip of the robot arm 20a to above the electric cell 110.

In step S13, the control unit 50 controls activation of the stacking robot 20 to move the handling unit 70 downwards toward the electric cell 110 on the feed table 21. In accordance with the downward movement of the handling unit 70, the lower edges of the covers 74a of the main-body suction pads 74 come into contact with the upper surface of the main body 110H. Further, the lower edges of the covers 83a of the tab suction pads 83 come into contact with the upper surface of the electrode tab 113. When the handling unit 70 further moves downwards, the covers 74a of the main-body suction pads 74 are elastically deformed, causing the lower edges of the covers 74a to be pressed against the upper surface of the main body 110H. Further, the covers 83a of the tab suction pads 83 are elastically deformed, causing the lower edges of the covers 83a to be pressed against the upper surface of the electrode tab 113.

In this state, the control unit 50 activates the suction device 75. Due to the negative pressure, the main body 110H is sucked on the main-body suction pads 74. Accordingly, the upper surface of the main body 110H is adsorbed and held. Due to the negative pressure, the electrode tab 113 is sucked on the tab suction pads 83. Accordingly, the upper surface of the electrode tab 113 is adsorbed and held. Furthermore, since the electrode tab 113 is sucked on the tab suction pads 83 from the reference blocks 80 side, the electrode tab 113 is pressed against the lower surfaces 80a of the reference blocks 80 (see FIG. 11B).

In step S14, the control unit 50 controls activation of the stacking robot 20 to raise the handling unit 70 to lift the adsorbed and held electric cell 110 from the feed table 21. Thereafter, the control unit 50 controls activation of the actuators to press down the activation rods 87 to cause the holding plates 84 to rotate to horizontally extending positions (see FIG. 10). Accordingly, the holding plates 84 hold the lower surface side of the electrode tab 113 via the first spacers 114. The holding plates 84 hold the lower surface side of the electrode tab 113, thereby pressing the electrode tab 113 against the reference blocks 80.

The electrode tab 113 is sucked on the tab suction pads 83 from the upper surface side. In addition, the holding plates 84 push up the electrode tab 113 from the lower surface side, thereby causing the electrode tab 113 to be pressed against the lower surfaces 80a of the reference blocks 80 (step S12, step S13). As a result, the deformation or bending of the electrode tab 113 is corrected, and the attitude of the electrode tab 113 is corrected (step S15).

In step S16, the control unit 50 controls activation of the stacking robot 20 to move the adsorbed and held electric cell 110 to the position at which the detection unit 40 is arranged. The electric cell 110 is moved so that the electrode tab 113 is positioned below the cameras 41. The first inspection hole 31 and the second inspection hole 32 in the electrode tab 113 and portions around the inspection holes 31 and 32 face the cameras 41 through the dents 71a of the top plate 71.

In step S17, the control unit 50 controls activation of the cameras 41 to capture images of the first inspection hole 31, the second inspection hole 32, and portions of the electrode tab 113 around the inspection holes 31 and 32.

In step S18, the control unit 50 receives input of image data captured by the cameras 41 and performs image analysis of the image data to determine the respective positions of the first inspection hole 31 and the second inspection hole 32.

In step S19, the control unit 50 determines the position of the midpoint 33 of the line segment connecting the first inspection hole 31 and the second inspection hole 32 on the basis of the detected center position of the first inspection hole 31 and the detected center position of the second inspection hole 32.

In step S20, the control unit 50 determines the amounts of correction (x, y, θ) for the attitude of the electric cell 110 relative to the preset stacking reference positions 60 for the electric cell 110. The stacking reference positions 60 are the first reference position 61 for positioning the first inspection hole 31, the second reference position 62 for positioning the second inspection hole 32, and the third reference position 63 for positioning the midpoint 33. As illustrated in FIG. 6A, the control unit 50 determines an amount of correction x (mm) in the X direction and an amount of correction y (mm) in the Y direction, which are necessary to position the midpoint 33 at the third reference position 63. After positioning the midpoint 33 at the third reference position 63, the control unit 50 further determines an amount of correction θ (degree) in the rotation direction, which is necessary to position the first inspection hole 31 at the first reference position 61 and to position the second inspection hole 32 at the second reference position 62.

In step S21, the control unit 50 controls activation of the stacking robot 20 to correct the attitude of the electric cell 110 on the basis of the calculated amounts of correction (x, y, θ). As illustrated in FIG. 6B, the control unit 50 corrects the attitude of the electric cell 110 held by the stacking robot 20 in the two X- and Y-axis directions. The amounts of correction are the amount of correction x (mm) in the X direction and the amount of correction y (mm) in the Y direction. Further, as illustrated in FIG. 6C, the control unit 50 rotates the attitude of the electric cell 110 held by the stacking robot 20 about the Z axis for correction. The amount of correction is the amount of correction θ (degree).

In step S22, the control unit 50 controls activation of the stacking robot 20 to stack the electric cell 110 on the jig 22 in such a manner that the first inspection hole 31, the second inspection hole 32, and the midpoint 33 are made to coincide with the first reference position 61, the second reference position 62, and the third reference position 63, respectively.

After the stacking of the electric cell 110 is completed, the control unit 50 stops the activation of the suction device 75, and leaves the inside of the main-body suction pads 74 and the inside of the tab suction pads 83 open to the air. Accordingly, the adsorption and holding of the main body 110H and the electrode tab 113 is canceled.

If the stacking of a predetermined number of electric cells 110 is not completed (step S23, NO), the electric cells 110 are stacked one after another such that the positions of the reference portions 30 in the electrode tabs 113 are made to coincide with the stacking reference positions 60 (steps S11 to S22). If the stacking of the predetermined number of electric cells 110 is completed (step S23, YES), the formation of the battery stack 110S is complete.

As described above, the battery stack forming apparatus 10 according to this embodiment includes the stacking robot 20 that holds and stacks each of the electric cells 110, the detection unit 40 (the cameras 41) that detects positions of the reference portions 30 set in at least two locations on the electrode tab 113 of the electric cell 110 held by the stacking robot 20, and the control unit 50. The control unit 50 holds, using the stacking robot 20, each of the electric cells 110, detects, using the detection unit 40, the positions of the reference portions 30, and stacks the electric cell 110 in such a manner that each of the positions of the reference portions 30 is made to coincide with one of the stacking reference positions 60 set in advance to form the battery stack 110S.

Further, a battery stack forming method according to this embodiment includes detecting positions of the reference portions 30 set in at least two locations on the electrode tab 113, and stacking the plurality of electric cells 110 in such a manner that each of the positions of the reference portions 30 is made to coincide with one of the stacking reference positions 60 set in advance to form the battery stack 110S.

With this configuration, the electric cells 110 can be stacked with the electric cells 110 accurately maintained in positions such that, in each of the stacked electric cells 110 in the battery stack 110S, the positions of the reference portions 30 in at least two locations on the electrode tab 113 coincide with the stacking reference positions 60. As a result of reducing the variation in the positions of the electrode tabs 113, the welding quality with which the electrode tabs 113 and the busbars 132 are joined by laser-welding can be stabilized.

The battery stack forming apparatus 10 further includes the reference blocks 80 against which the electrode tab 113 is to be relatively pressed, and the detection unit 40 detects the respective positions of the reference portions 30 in a state where an attitude of the electrode tab 113 is corrected by relatively pressing the electrode tab 113 against the reference blocks 80.

Further, in the battery stack forming method, when the positions of the reference portions 30 are detected, the electrode tab 113 is relatively pressed against the reference blocks 80 to correct an attitude of the electrode tab 113.

With this configuration, the attitude of the electrode tab 113 is corrected, and the respective positions of the reference portions 30 can be accurately detected.

In the battery stack forming apparatus 10, the reference blocks 80 are installed in the stacking robot 20.

With this configuration, the attitude of the electrode tab 113 can be corrected during a period from when the electric cell 110 is held to when the electric cell 110 is moved to the position of the detection unit 40.

Accordingly, reducing the time taken for use only to correct the attitude of the electrode tabs 113 can rapidly stack the electric cells 110. Therefore, the productivity of the battery stack 110S improves.

The battery stack forming apparatus 10 further includes the pressing unit 82 that relatively presses the electrode tab 113 against the reference blocks 80.

With this configuration, the pressing unit 82 ensures that the electrode tab 113 can be relatively pressed against the reference blocks 80. This ensures that the attitude (such as bending or warp) of the electrode tab 113 can be corrected, and the accuracy of the detected positions of the reference portions 30 improves.

The pressing unit 82 includes the tab suction pads 83 on which the electrode tab 113 is to be sucked by vacuum from the reference blocks 80 side.

Further, in the battery stack forming method, the electrode tab 113 is sucked by vacuum to press the electrode tab 113 against the reference blocks 80.

With this configuration, the reference blocks 80 function as adsorption plates that utilize the negative pressure, ensuring that the electrode tab 113 can be relatively pressed against the reference blocks 80. This ensures that the attitude (such as bending or warp) of the electrode tab 113 can be corrected, and the accuracy of the detected positions of the reference portions 30 improves.

The pressing unit 82 further includes the holding plates 84 that hold a lower surface side of the electrode tab 113 of the electric cell 110.

With this configuration, the lower surface side of the electrode tab 113 is held by the holding plates 84, and the electrode tab 113 can be relatively pressed against the reference blocks 80. This ensures that the attitude (such as bending or warp) of the electrode tab 113 can be corrected, and the accuracy of the detected positions of the reference portions 30 improves.

The reference portions 30 of the electrode tab 113 include the first inspection hole 31 (the first reference portion 31) and the second inspection hole 32 (the second reference portion 32), and the stacking reference positions 60 include the first reference position 61 for positioning the first inspection hole 31, the second reference position 62 for positioning the second inspection hole 32, and the third reference position 63 for positioning the midpoint of the line segment connecting the first reference position 61 and the second reference position 62. The control unit 50 controls activation of the stacking robot 20 to correct the position of the electric cell 110 so that a position of the first inspection hole 31, a position of the second inspection hole 32, and a position of the midpoint 33 of the line segment connecting the first inspection hole 31 and the second inspection hole 32, which are detected by the detection unit 40, are made to coincide with the first reference position 61, the second reference position 62, and the third reference position 63, respectively.

With this configuration, in each of the stacked electric cells 110 in the battery stack 110S, the positions of three locations on the electrode tab 113 coincide with the three stacking reference positions 60. This enables the electric cells 110 to be stacked with the electric cells 110 more accurately maintained in positions.

Figure 14A:
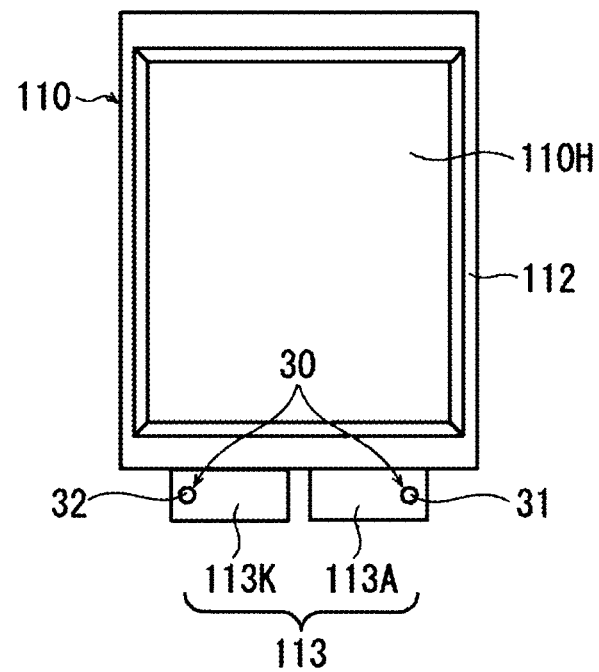
FIG. 14A is a plan view illustrating an example of an embodiment of reference portions set on an electrode tab.

(Modifications) FIG. 14A is a plan view illustrating an example of the embodiment described above of the reference portions 30 set on the electrode tab 113, and FIG. 14B, FIG. 15A, FIG. 15B, FIG. 16A, and FIG. 16B are plan views illustrating Modifications 1 to 5 of reference portions 90.

The reference portions 30 set on the electrode tab 113 are not limited to those in the example of the embodiment illustrated in FIG. 14A.

Figure 14B:
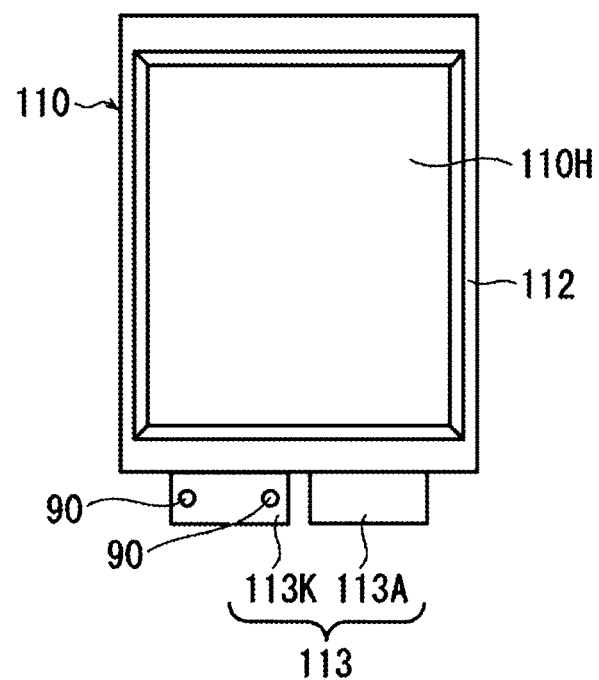
FIG. 14B is a plan view illustrating Modification 1 of reference portions set on an electrode tab.
Figure 15A:
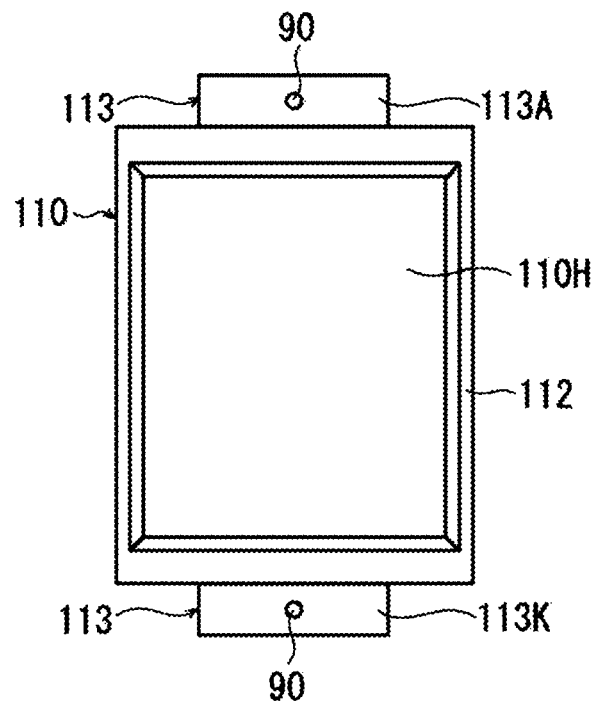
FIG. 15A is a plan view illustrating Modification 2 of reference portions set on an electrode tab.
Figure 15B:
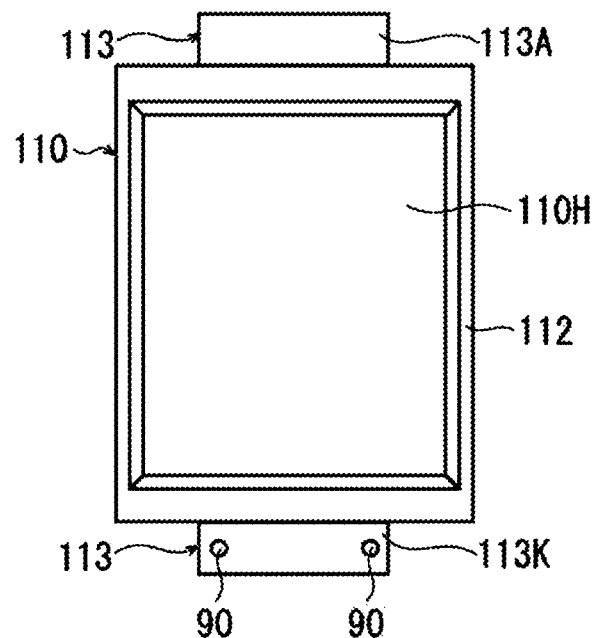
FIG. 15B is a plan view illustrating Modification 3 of reference portions set on an electrode tab.
Figure 16A:
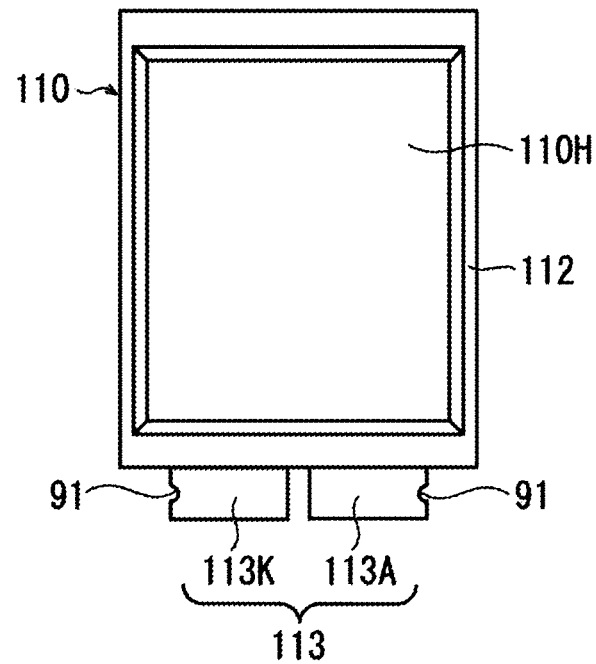
FIG. 16A is a plan view illustrating Modification 4 of reference portions set on an electrode tab.
Figure 16B:
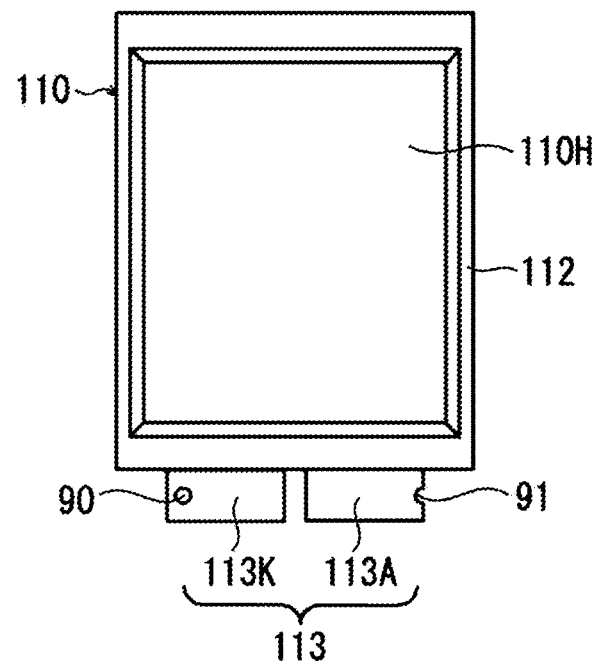
FIG. 16B is a plan view illustrating Modification 5 of reference portions set on an electrode tab.

For example, as in Modification 1 illustrated in FIG. 14B, one of the anode-side electrode tab 113A and the cathode-side electrode tab 113K (in the illustrated example, the cathode-side electrode tab 113K) may have two reference portions 90.

The present invention is also applicable to electric cells 110 each having an electrode tab 113 guided from two facing sides of the packaging material. As in Modification 2 illustrated in FIG. 15A, each of the anode-side electrode tab 113A and the cathode-side electrode tab 113K may have one reference portion 90. As in Modification 3 illustrated in FIG. 15B, only the cathode-side electrode tab 113K may have two reference portions 90.

The reference portions 90 are not limited to the case where the reference portions 90 are formed by through-holes. As in Modification 4 illustrated in FIG. 16A, reference portions 91 may be formed by cutouts. As in Modification 5 illustrated in FIG. 16B, a reference portion 90 formed by a through-hole and a reference portion 91 formed by a cutout may be used in combination.

(Other Modifications)

The present invention is not limited to the embodiment and modifications described above and can be modified as appropriate.

For example, while an embodiment has been provided in which the electrode tab 113 is moved and pressed against the reference blocks 80, the electrode tab 113 and the reference blocks 80 may be relatively pressed against each other to correct the attitude of the electrode tab 113. Accordingly, in a modified embodiment, the reference blocks 80 may be moved and pressed against the electrode tab 113.

While an embodiment has been provided in which the reference blocks 80 are installed in the stacking robot 20, so long as the reference blocks 80 have a function of correcting the attitude of the electrode tab 113, the reference blocks 80 may be arranged at positions separate from the stacking robot 20.

An embodiment has been provided in which the pressing unit 82 that relatively presses the electrode tab 113 against the reference blocks 80 includes the tab suction pads 83 on which the electrode tab 113 is to be sucked by vacuum, and the holding plates 84 that hold the lower surface side of the electrode tab 113. However, the pressing unit 82 may not be provided with both the tab suction pads 83 and the holding plates 84. The pressing unit 82 may include either the tab suction pads 83 or the holding plates 84. In addition, the electrode tab 113 is not necessarily sucked by vacuum. In a modified configuration, the electrode tab 113 may be sucked by magnetic force or static electricity and may be pressed against the reference blocks 80.

A specific process for detecting the respective positions of the reference portions 30 of the electrode tab 113 using the detection unit 40 or a specific process for making the respective positions of the reference portions 30 coincide with the stacking reference positions 60 is not limited to that in the example described above and may be modified as appropriate.

REFERENCE SIGNS LIST

10 battery stack forming apparatus,
20 stacking robot,
20*a* robot arm,
21 feed table,
22 jig,
30 reference portion,
31 first inspection hole (first reference portion),
32 second inspection hole (second reference portion),
33 midpoint,
40 detection unit,
41 camera,
50 control unit,
60 stacking reference position,
61 first reference position,
62 second reference position,
63 third reference position,
70 handling unit,
71 top plate,
71*a* dent,
72 connection unit,
73 holding unit,
74 main-body suction pad,
74*a* cover,
75 suction device,
80 reference block,
80*a* lower surface,
80*b* recess,
81 attachment block,
82 pressing unit,
83 tab suction pad (suction pad),
83*a* cover,
84 holding plate,
85 drive shaft,
86 drive plate,
87 activation rod,
88 main-body holding plate,
90 reference portion,
91 reference portion,
100 battery module,
110 electric cell,
110H main body,
110S battery stack,
111 power generation element,
112 laminate film,
113 electrode tab,
113A anode-side electrode tab,
113K cathode-side electrode tab,
113*c* proximal end portion,
113*d* distal end portion,
114 first spacer,
115 second spacer,
132 busbar.

The invention claimed is:

1. A battery stack forming apparatus for stacking a plurality of flat electric cells, each including an electrode tab and a main body having a power generation element, in a thickness direction of the main body to form a battery stack, the battery stack forming apparatus comprising:
a stacking robot that holds and stacks each of the electric cells;
a detection unit that detects positions of reference portions set in at least two locations on the electrode tab of the electric cell held by the stacking robot;
a control unit that controls activation of the stacking robot and the detection unit; and
a reference block against which the electrode tab is to be relatively pressed, and
a pressing unit that relatively presses the electrode tab against the reference block, the pressing unit including a suction pad on which the electrode tab is to be sucked by vacuum from the reference block side,
wherein the control unit holds, using the stacking robot, each of the electric cells, detects, using the detection unit, the positions of the reference portions in a state where an attitude of the electrode tab is corrected by relatively pressing the electrode tab against the reference block, and stacks the electric cell in such a manner that each of the positions of the reference portions is made to coincide with one of stacking reference positions set in advance to form the battery stack.

2. The battery stack forming apparatus according to claim 1, wherein the reference block is installed in the stacking robot.

3. The battery stack forming apparatus according to claim 1, wherein the pressing unit further includes a holding plate that holds a lower surface side of the electrode tab of the electric cell.

4. The battery stack forming apparatus according to claim 1, wherein the reference portions of the electrode tab include a first reference portion and a second reference portion,
wherein the stacking reference positions include a first reference position for positioning the first reference portion, a second reference position for positioning the second reference portion, and a third reference position for positioning a midpoint of a line segment connecting the first reference position and the second reference position, and
wherein the control unit controls activation of the stacking robot to correct a position of the electric cell so that a position of the first reference portion, a position of the second reference portion, and a position of the midpoint of the line segment connecting the first reference portion and the second reference portion, which are detected by the detection unit, are made to coincide with the first reference position, the second reference position, and the third reference position, respectively.

5. A battery stack forming method for stacking a plurality of flat electric cells, each including an electrode tab and a main body having a power generation element, in a thickness direction of the main body to form a battery stack, the battery stack forming method comprising:
detecting positions of reference portions set in at least two locations on the electrode tab in a state where an attitude of the electrode tab is corrected by relatively pressing the electrode tab against a reference block; and stacking the plurality of electric cells in such a manner that each of the positions of the reference portions is made to coincide with one of stacking reference positions set in advance to form the battery stack,
wherein the electrode tab is sucked by vacuum to press the electrode tab against the reference block.

6. The battery stack forming apparatus according to claim 2, further comprising a pressing unit that relatively presses the electrode tab against the reference block.

7. The battery stack forming apparatus according to claim 1, wherein the pressing unit further includes a holding plate that holds a lower surface side of the electrode tab of the electric cell.

8. The battery stack forming apparatus according to claim 2, wherein the reference portions of the electrode tab include a first reference portion and a second reference portion,
wherein the stacking reference positions include a first reference position for positioning the first reference portion, a second reference position for positioning the second reference portion, and a third reference position for positioning a midpoint of a line segment connecting the first reference position and the second reference position, and
wherein the control unit controls activation of the stacking robot to correct a position of the electric cell so that a position of the first reference portion, a position of the second reference portion, and a position of the midpoint of the line segment connecting the first reference portion and the second reference portion, which are detected by the detection unit, are made to coincide with the first reference position, the second reference position, and the third reference position, respectively.

9. A battery stack forming apparatus for stacking a plurality of flat electric cells, each including an electrode tab and a main body having a power generation element, in a thickness direction of the main body to form a battery stack, the battery stack forming apparatus comprising:
a stacking robot that holds and stacks each of the electric cells;
a detection unit that detects positions of reference portions set in at least two locations on the electrode tab of the electric cell held by the stacking robot;
a control unit that controls activation of the stacking robot and the detection unit; and
a reference block against which the electrode tab is to be relatively pressed, and
a pressing unit that relatively presses the electrode tab against the reference block, the pressing unit including a holding plate that holds a lower surface side of the electrode tab of the electric cell,
wherein the control unit holds, using the stacking robot, each of the electric cells, detects, using the detection unit, the positions of the reference portions in a state where an attitude of the electrode tab is corrected by relatively pressing the electrode tab against the reference block, and stacks the electric cell in such a manner that each of the positions of the reference portions is made to coincide with one of stacking reference positions set in advance to form the battery stack.

10. The battery stack forming apparatus according to claim 9, wherein the reference portions of the electrode tab include a first reference portion and a second reference portion,
wherein the stacking reference positions include a first reference position for positioning the first reference portion, a second reference position for positioning the second reference portion, and a third reference position for positioning a midpoint of a line segment connecting the first reference position and the second reference position, and
wherein the control unit controls activation of the stacking robot to correct a position of the electric cell so that a position of the first reference portion, a position of the second reference portion, and a position of the midpoint of the line segment connecting the first reference portion and the second reference portion, which are detected by the detection unit, are made to coincide with the first reference position, the second reference position, and the third reference position, respectively.

11. A battery stack forming apparatus for stacking a plurality of flat electric cells, each including an electrode tab and a main body having a power generation element, in a thickness direction of the main body to form a battery stack, the battery stack forming apparatus comprising:
a stacking robot that holds and stacks each of the electric cells;
a detection unit that detects positions of reference portions set in at least two locations on the electrode tab of the electric cell held by the stacking robot; and
a control unit that controls activation of the stacking robot and the detection unit; and
a reference block against which the electrode tab is to be relatively pressed, wherein the reference block is installed in the stacking robot,
wherein the control unit holds, using the stacking robot, each of the electric cells, detects, using the detection unit, the positions of the reference portions in a state where an attitude of the electrode tab is corrected by relatively pressing the electrode tab against the reference block, and stacks the electric cell in such a manner that each of the positions of the reference portions is made to coincide with one of stacking reference positions set in advance to form the battery stack,
wherein the reference portions of the electrode tab include a first reference portion and a second reference portion,
wherein the stacking reference positions include a first reference position for positioning the first reference portion, a second reference position for positioning the second reference portion, and a third reference position for positioning a midpoint of a line segment connecting the first reference position and the second reference position, and
wherein the control unit controls activation of the stacking robot to correct a position of the electric cell so that a position of the first reference portion, a position of the second reference portion, and a position of the midpoint of the line segment connecting the first reference portion and the second reference portion, which are detected by the detection unit, are made to coincide with the first reference position, the second reference position, and the third reference position, respectively.

12. The battery stack forming apparatus according to claim 11, wherein the reference portions of the electrode tab include a first reference portion and a second reference portion,
wherein the stacking reference positions include a first reference position for positioning the first reference portion, a second reference position for positioning the second reference portion, and a third reference position for positioning a midpoint of a line segment connecting the first reference position and the second reference position, and
wherein the control unit controls activation of the stacking robot to correct a position of the electric cell so that a position of the first reference portion, a position of the second reference portion, and a position of the midpoint of the line segment connecting the first reference portion and the second reference portion, which are detected by the detection unit, are made to coincide with the first reference position, the second reference position, and the third reference position, respectively.

* * * * *